United States Patent
Paxton et al.

(10) Patent No.: US 9,533,652 B1
(45) Date of Patent: Jan. 3, 2017

(54) ONE-DIRECTIONAL VALVE FOR MULTI-CHAMBER AIRBAGS

(71) Applicant: Autoliv ASP, Inc., Ogden, UT (US)

(72) Inventors: Donald James Paxton, Romeo, MI (US); Jamel Belwafa, Ann Arbor, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/799,302

(22) Filed: Jul. 14, 2015

(51) Int. Cl.
 *B60R 21/239* (2006.01)
 *B60R 21/231* (2011.01)
 *B60R 21/233* (2006.01)

(52) U.S. Cl.
 CPC ........... *B60R 21/239* (2013.01); *B60R 21/231* (2013.01); *B60R 2021/2395* (2013.01); *B60R 2021/23324* (2013.01)

(58) Field of Classification Search
 CPC .... B60R 21/239; B60R 21/231; B60R 21/233; B60R 2021/2395; B60R 2021/23324
 See application file for complete search history.

(56) References Cited

U.S. PATENT DOCUMENTS

| | | |
|---|---|---|
| 3,614,129 A | 10/1971 | Sobkow |
| 3,642,303 A | 2/1972 | Irish et al. |
| 3,768,830 A | 10/1973 | Hass |
| 3,801,126 A | 4/1974 | Knight, IV et al. |
| 4,043,572 A | 8/1977 | Hattori et al. |
| 4,262,931 A | 4/1981 | Strasser et al. |
| 5,556,128 A | 9/1996 | Sinnhuber |
| 5,575,497 A | 11/1996 | Suyama |
| 5,586,782 A | 12/1996 | Zimmerman, II |
| 5,609,363 A | 3/1997 | Finelli |
| 5,697,641 A * | 12/1997 | McGee ............. B60R 21/23138 280/730.2 |
| 5,791,685 A | 8/1998 | Lachat et al. |
| 5,803,485 A | 9/1998 | Acker et al. |

(Continued)

FOREIGN PATENT DOCUMENTS

| | | |
|---|---|---|
| DE | 10146493 A1 | 4/2003 |
| DE | 102010019592 A1 | 11/2011 |

(Continued)

OTHER PUBLICATIONS

International Search Report and Written Opinion for PCT/US2015/029615 mailed Sep. 23, 2015.

(Continued)

*Primary Examiner* — Drew Brown
(74) *Attorney, Agent, or Firm* — Stoel Rives LLP

(57) ABSTRACT

An airbag can include a first cushion portion that defines a first inflatable chamber and a second cushion portion that is connected to the first cushion portion and defines a second inflatable chamber. The first inflatable chamber can receive inflation gas from an inflator to expand the first cushion portion, and the second cushion portion can receive inflation gas from the first inflatable chamber to expand the second cushion portion. A one-directional valve permits inflation gas to flow from the first inflatable chamber to the second inflatable chamber and restricts backflow of inflation gas from the second inflatable chamber to the first inflatable chamber.

33 Claims, 13 Drawing Sheets

(56) References Cited

U.S. PATENT DOCUMENTS

| | | | |
|---|---|---|---|
| 5,839,755 A * | 11/1998 | Turnbull | F16K 15/202 |
| | | | 280/739 |
| 5,853,191 A | 12/1998 | Lachat et al. | |
| 5,945,184 A | 8/1999 | Nagata | |
| 6,123,355 A | 9/2000 | Sutherland | |
| 6,126,196 A | 10/2000 | Zimmerman | |
| 6,135,493 A | 10/2000 | Jost et al. | |
| 6,139,052 A | 10/2000 | Preamprasitchai | |
| 6,158,765 A | 12/2000 | Sinnhuber et al. | |
| 6,196,575 B1 | 3/2001 | Ellerbrok et al. | |
| 6,247,727 B1 | 6/2001 | Hamada | |
| 6,254,121 B1 | 7/2001 | Fowler et al. | |
| 6,308,983 B1 | 10/2001 | Sinnhuber | |
| 6,419,262 B1 | 7/2002 | Fendt et al. | |
| 6,431,586 B1 | 8/2002 | Eyrainer et al. | |
| 6,648,371 B2 | 11/2003 | Vendely | |
| 6,786,505 B2 | 9/2004 | Yoshida et al. | |
| 6,971,664 B2 | 12/2005 | Amamori et al. | |
| 7,040,650 B2 | 5/2006 | Neupert et al. | |
| 7,261,320 B2 | 8/2007 | Fredin et al. | |
| 7,347,450 B2 | 3/2008 | Williams et al. | |
| 7,475,904 B2 * | 1/2009 | Hofmann | B60R 21/23138 |
| | | | 280/730.2 |
| 7,571,929 B2 | 8/2009 | Fukawatase et al. | |
| 7,726,685 B2 | 6/2010 | Abe et al. | |
| 7,850,200 B2 | 12/2010 | Zauritz et al. | |
| 7,938,445 B2 | 5/2011 | Smith et al. | |
| 7,942,443 B2 | 5/2011 | Dennis et al. | |
| 7,988,188 B2 | 8/2011 | Zauritz et al. | |
| 8,186,713 B2 | 5/2012 | Fischer et al. | |
| 8,215,665 B2 | 7/2012 | Ohara et al. | |
| 8,567,817 B2 * | 10/2013 | Yamamoto | B60R 21/23138 |
| | | | 280/729 |
| 8,573,641 B2 * | 11/2013 | Marable | B60R 21/239 |
| | | | 280/738 |
| 8,596,678 B2 | 12/2013 | Ravenberg et al. | |
| 2003/0094794 A1 | 5/2003 | Amamori | |
| 2003/0193174 A1 | 10/2003 | Abe | |
| 2003/0209895 A1 | 11/2003 | Gu | |
| 2003/0218325 A1 | 11/2003 | Hasebe et al. | |
| 2004/0046369 A1 | 3/2004 | Michael et al. | |
| 2004/0090054 A1 | 5/2004 | Bossecker et al. | |
| 2004/0145161 A1 | 7/2004 | Hasebe et al. | |
| 2005/0029781 A1 | 2/2005 | Enders et al. | |
| 2005/0104339 A1 | 5/2005 | Hasebe et al. | |
| 2005/0110249 A1 | 5/2005 | Hasebe | |
| 2005/0184489 A1 | 8/2005 | Kobayashi | |
| 2005/0269808 A1 | 12/2005 | Song et al. | |
| 2006/0006631 A1 | 1/2006 | Meissner et al. | |
| 2006/0175809 A1 | 8/2006 | Yamaji et al. | |
| 2006/0197324 A1 | 9/2006 | Klinkenberger | |
| 2006/0232050 A1 | 10/2006 | Kumagai et al. | |
| 2006/0284400 A1 | 12/2006 | Sakakibara et al. | |
| 2006/0290111 A1 | 12/2006 | Kokeguchi | |
| 2007/0126217 A1 | 6/2007 | Nayef | |
| 2007/0170710 A1 | 7/2007 | Bouquier | |
| 2007/0210565 A1 | 9/2007 | Song et al. | |
| 2008/0048420 A1 | 2/2008 | Washino | |
| 2008/0054602 A1 | 3/2008 | Yang | |
| 2008/0073893 A1 | 3/2008 | Schneider | |
| 2008/0100041 A1 | 5/2008 | Kim et al. | |
| 2008/0143086 A1 | 6/2008 | Higuchi | |
| 2008/0179867 A1 | 7/2008 | Riedel et al. | |
| 2008/0308338 A1 | 12/2008 | Kitte et al. | |
| 2009/0020987 A1 | 1/2009 | Wipasuramonton | |
| 2009/0026743 A1 | 1/2009 | Arez | |
| 2009/0121462 A1 | 5/2009 | Rick | |
| 2009/0189374 A1 | 7/2009 | Fukawatase | |
| 2010/0066064 A1 | 3/2010 | Kotikovsky | |
| 2010/0252350 A1 | 10/2010 | Hayashi et al. | |
| 2011/0101660 A1 | 5/2011 | Schneider et al. | |
| 2011/0140398 A1 | 6/2011 | Song et al. | |
| 2012/0025497 A1 | 2/2012 | Yoo | |
| 2012/0200069 A1 | 8/2012 | Kato et al. | |
| 2012/0223550 A1 | 9/2012 | Mazanek | |
| 2012/0299277 A1 * | 11/2012 | Fischer | B60R 21/239 |
| | | | 280/739 |
| 2013/0001935 A1 | 1/2013 | Nagasawa et al. | |
| 2013/0087995 A1 | 4/2013 | Lee et al. | |
| 2013/0334801 A1 * | 12/2013 | Williams | B60R 21/239 |
| | | | 280/739 |
| 2014/0151985 A1 * | 6/2014 | Hotta | B60R 21/23138 |
| | | | 280/730.2 |
| 2014/0265271 A1 | 9/2014 | Dinsdale et al. | |
| 2014/0375032 A1 | 12/2014 | Fukawatase et al. | |
| 2015/0035263 A1 * | 2/2015 | Guerrero | B60R 21/233 |
| | | | 280/729 |
| 2015/0042080 A1 * | 2/2015 | Guerrero | B60R 21/233 |
| | | | 280/729 |
| 2015/0069741 A1 * | 3/2015 | Shimazu | B60R 21/18 |
| | | | 280/728.3 |
| 2015/0158452 A1 | 6/2015 | Choi et al. | |
| 2015/0166002 A1 | 6/2015 | Fukawatase et al. | |
| 2015/0175116 A1 | 6/2015 | Cho et al. | |
| 2015/0217716 A1 * | 8/2015 | Anderson | B60R 21/2338 |
| | | | 280/729 |
| 2015/0258959 A1 * | 9/2015 | Belwafa | B60R 21/233 |
| | | | 280/729 |
| 2015/0266447 A1 * | 9/2015 | Hiruta | B60R 21/203 |
| | | | 280/731 |
| 2015/0298643 A1 * | 10/2015 | Schneider | B60R 21/233 |
| | | | 280/729 |
| 2016/0039385 A1 | 2/2016 | Watamori et al. | |
| 2016/0046257 A1 * | 2/2016 | Yamada | B60R 21/2338 |
| | | | 280/729 |
| 2016/0075303 A1 * | 3/2016 | Iida | B60R 21/23138 |
| | | | 280/729 |
| 2016/0101757 A1 * | 4/2016 | Fujiwara | B60R 21/23138 |
| | | | 280/729 |

FOREIGN PATENT DOCUMENTS

| | | |
|---|---|---|
| DE | 102012019581 A1 | 4/2012 |
| EP | 2617607 A1 | 7/2013 |
| JP | 06024283 | 2/1994 |
| WO | 2015156088 | 10/2015 |

OTHER PUBLICATIONS

Office Action mailed Sep. 4, 2015, in U.S. Appl. No. 14/258,853, filed Apr. 22, 2014.

Office Action mailed Aug. 4, 2015, in U.S. Appl. No. 14/512,025, filed Oct. 10, 2014.

International Search Report and Written Opinion for PCT/US2014/067283 mailed Feb. 20, 2015.

Office Action mailed Dec. 5, 2014, in U.S. Appl. No. 14/099,928, filed Dec. 7, 2013.

Office Action mailed Jan. 9, 2015, in U.S. Appl. No. 14/294,405, filed Jun. 3, 2014.

Restriction Requirement mailed May 12, 2015, in U.S. Appl. No. 14/512,025, filed Oct. 10, 2014.

Office Action mailed May 21, 2015, in U.S. Appl. No. 14/099,928, filed Dec. 7, 2013.

Office Action mailed Jun. 25, 2015, in U.S. Appl. No. 14/294,405, filed Jun. 3, 2014.

International Search Report and Written Opinion for PCT/US2015/019716 mailed Jun. 3, 2015.

Office Action mailed Dec. 10, 2015, in U.S. Appl. No. 14/099,928, filed Dec. 7, 2013.

Office Action mailed Apr. 21, 2016, in U.S. Appl. No. 14/258,853, filed Apr. 22, 2014.

* cited by examiner

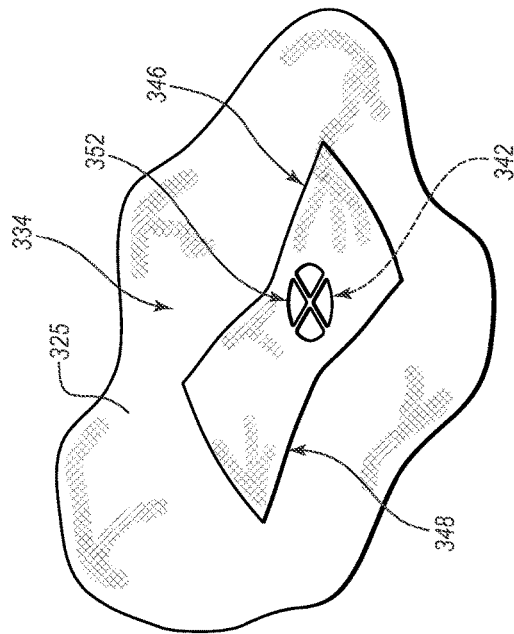
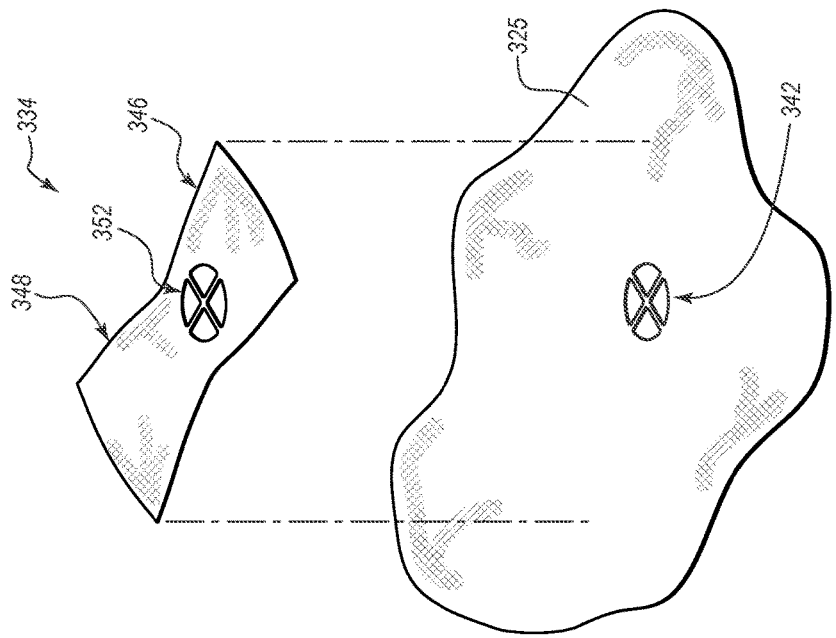
FIG. 3A
FIG. 3B

ONE-DIRECTIONAL VALVE FOR MULTI-CHAMBER AIRBAGS

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 3A is a close-up perspective view of a one-directional valve during a manufacturing process, according to one embodiment, before coupling a first valve layer to a sidewall of an inflatable chamber.

FIG. 3B shows the valve of FIG. 3A at another stage of the manufacturing process, in which the vent aperture and the valve aperture are aligned.

DETAILED DESCRIPTION

Figure 1A:
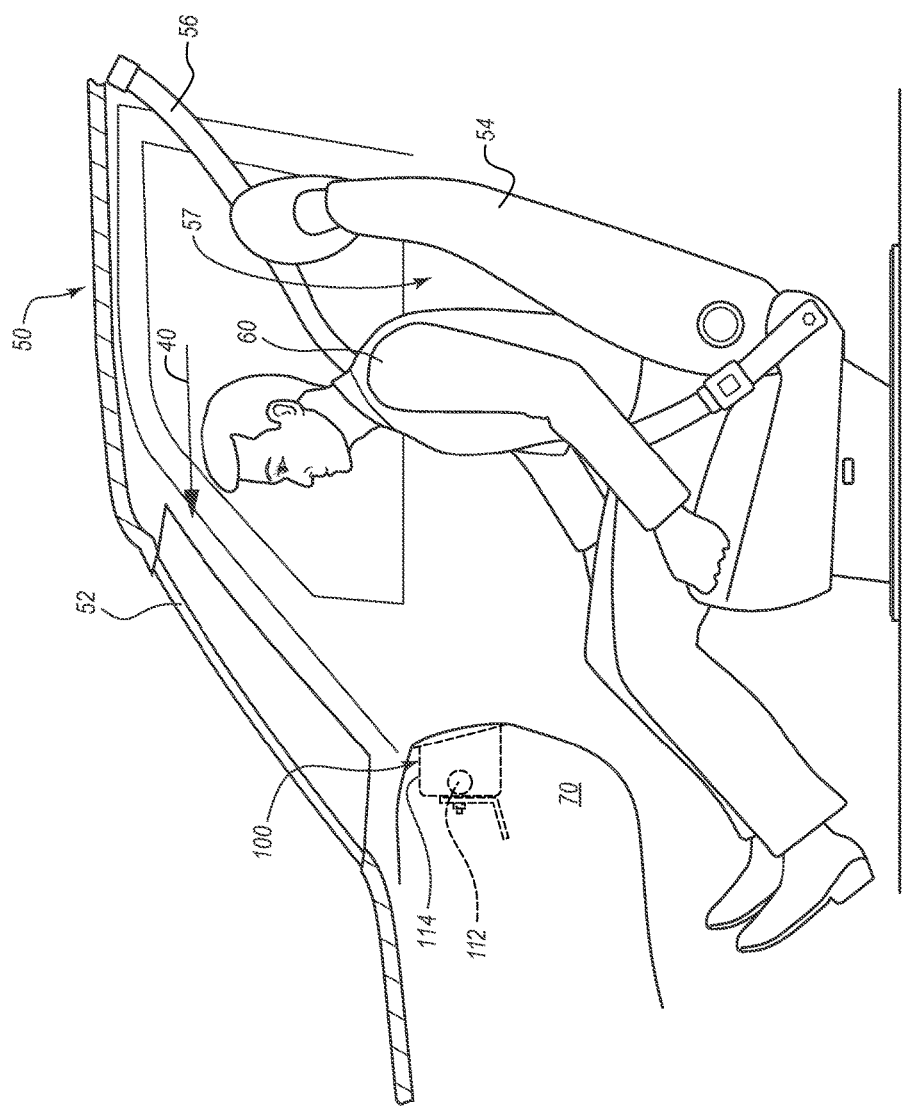
FIG. 1A is a side elevation view of an airbag assembly, according to one embodiment of the present disclosure, in a packaged state within a vehicle.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for use as passenger airbags, and may be mounted in a dashboard. In some embodiments, an airbag assembly includes an airbag comprising multiple portions (e.g., cushions, chambers, regions, sections, or pieces) that are configured to cushion an occupant during a collision event. A first or primary cushion portion can be configured to deploy primarily toward a vehicle occupant position (e.g., the position typically occupied by a passenger). This primary cushion portion may be configured to receive the torso and/or the head of a passenger in a frontal collision event. A second or supplemental cushion portion may be configured to deploy primarily in a different direction, such as, for example, in an inboard direction. For example, the supplemental cushion portion may be configured to deploy primarily in a direction that is lateral, transverse, or perpendicular to the direction in which the first cushion portion is deployed. The supplemental cushion portion may be particularly suited for cushioning the head of a vehicle occupant when the occupant moves in an oblique direction relative to a direction of travel of the vehicle.

Airbags that have multiple cushion portions (e.g., multichamber airbags) may provide increased protection to a passenger, as compared with certain airbags that have only a single inflatable portion. For example, in some embodiments, the first (e.g., primary) cushion portion may be configured to receive a vehicle occupant in a frontal collision event that causes the vehicle occupant to move primarily directly forward, as previously stated, and/or primarily in a direction of travel. The second (e.g., supplemental) cushion portion may be configured to stabilize the first cushion portion relative to the dashboard and/or receive the passenger when the vehicle is involved in a collision that causes the vehicle occupant to move in both a forward direction and an inboard direction (e.g., oblique to the direction of travel).

For example, in some instances a single-chamber airbag may be too narrow to provide effective coverage for a vehicle occupant who has a forward and inboard trajectory (which may also be referred to as an angled or oblique trajectory). In some instances, a vehicle occupant may slide off of the single-chamber airbag cushion during loading of the airbag when the occupant has a forward and inboard trajectory, or the occupant may entirely fail to engage with the cushion. An occupant's inboard (e.g., lateral) trajectory may arise from frontal-impact collisions where the impact is not distributed uniformly across the front plane of the vehicle. Such collisions may be, for example, oblique vehicle-to-vehicle collisions, such as collisions in which, immediately prior to impact, the occupant's vehicle is traveling in a direction that is not substantially parallel to the other vehicle's direction of travel; co-linear vehicle-to-vehicle collisions, such as collisions where, immediately prior to impact, both vehicles are traveling in substantially parallel directions; or collisions with a stationary object. These collisions can result in oblique movement of the occupant, which may allow the occupant's head to slide or fall off the primary cushion.

As the head falls from the primary cushion, a head twist can result that can cause severe angular velocity of the vehicle occupant's head. Reducing the angular velocity of the head can also reduce a likelihood of head and/or brain injury. A second cushion portion can aid in reducing the angular velocity of the head. In addition to cushioning the head, a secondary cushion portion can be configured in such a way to provide more cushion surface contact area around the occupant's head. The secondary cushion portion can protrude above the contact surface of the primary cushion.

Some embodiments disclosed herein can provide improved positioning, cushioning, and/or safety to occupants involved in particular types of collisions. For example, some embodiments can be particularly suited to cushion front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol (Version II)* (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012).

In some embodiments, the first cushion portion is configured to inflate prior to inflation of a second cushion portion. For example, during a deployment event, an inflator may fill a first cushion portion with gas until the pressure within the airbag causes a temporary fastener to release the second cushion portion for deployment. In some embodiments, a first cushion portion may deploy or begin deployment before the second cushion portion begins to be deployed. The second cushion portion can be configured to receive gas via a vent that fluidly couples the first and second cushion portions. The vent may be one-directional and/or adaptively closeable to restrict airflow from the second inflatable chamber to the first inflatable chamber upon equalization of pressure in the second inflatable chamber with pressure in the first inflatable chamber. Advantages of various embodiments will be evident from the present disclosure.

Figure 1B:
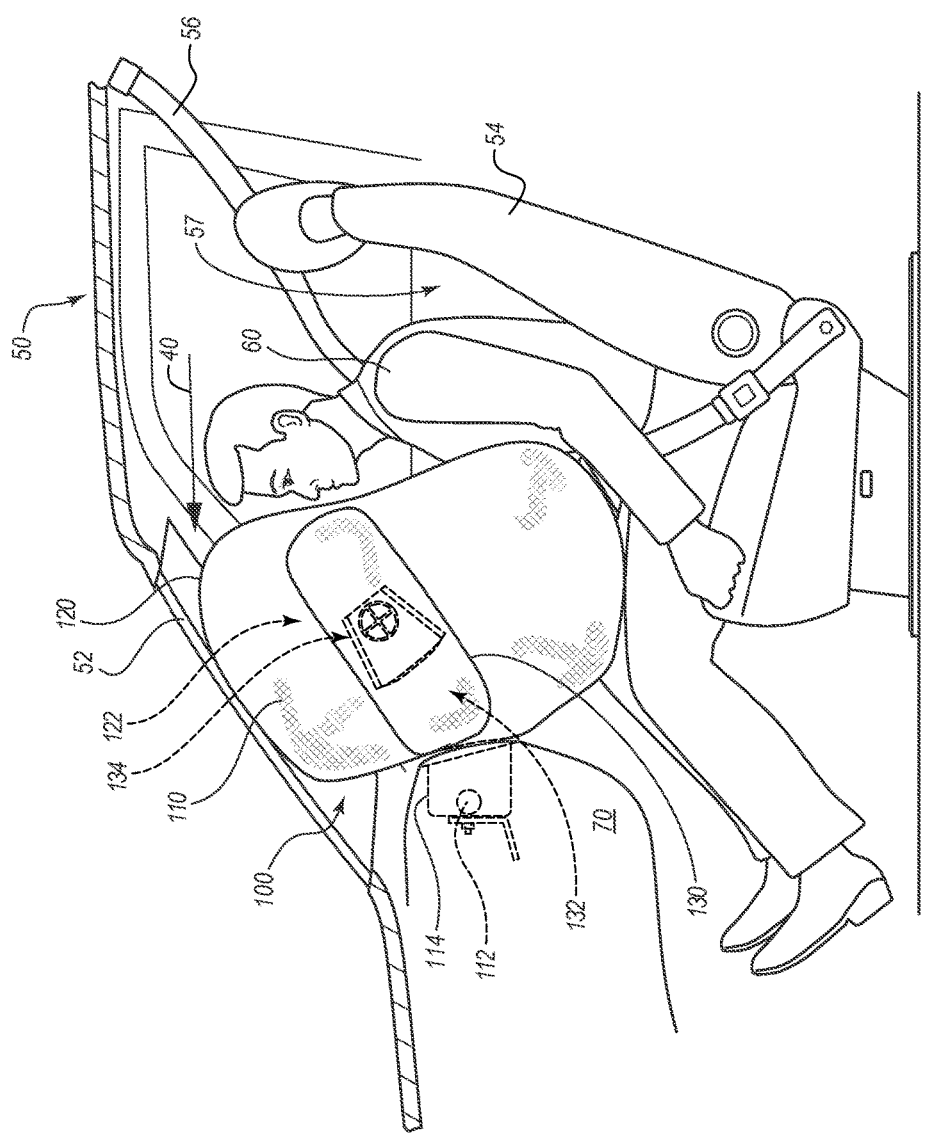
FIG. 1B is a side elevation view of the airbag assembly of FIG. 1A, in a deployed state within a vehicle. The airbag assembly includes a multi-chambered airbag with a supplemental cushion attached to a primary cushion. The vehicle occupant is depicted moving toward the deployed airbag assembly in a direction of travel of the vehicle.

FIG. 1A is an elevation view of an instrument panel 70 and an airbag assembly 100, according to one embodiment, in a compact state disposed within a vehicle 50. FIG. 1B depicts the airbag assembly 100 of FIG. 1A in a deployed and inflated configuration. In many vehicles, a central region of the instrument panel 70 may include a stack of various buttons, controls, and/or user interfaces. For example, the central region of the instrument panel 70, the center stack or IP stack, may include one or more of a screen, radio controls, other media controls, or climate controls. A vehicle occupant 60 is shown seated in a front passenger seat 54 of the vehicle 50. When in a packaged state, the airbag assembly 100 may be disposed in the instrument panel 70. As illustrated in FIGS. 1A and 1B, an occupant restraint system can include the airbag assembly 100 and any other suitable restraint devices, such as a seatbelt 56.

Referring generally and collectively to FIGS. 1A and 1B, the airbag assembly 100 may include an airbag cushion 110 (which may also be referred to as airbag 110), an inflator 112, and an airbag housing 114. The airbag housing 114 may be of any suitable variety, and may include a cover (not shown), behind which the airbag cushion 110 is located. The cover may be of any suitable variety, and may include a tear seam or burst seam through which the airbag cushion 110 may deploy. The housing 114 may be mounted within and fixed to the instrument panel 70 in any suitable manner.

The airbag 110 may be manufactured in any suitable manner, such as via one-piece weaving, "cut and sew" techniques, or a combination of these and/or other methods. In some embodiments, separate panels may be joined together by sealed or unsealed seams, with the seams formed by a variety of suitable techniques. For example the seams may be formed by stitching, adhesive, taping, radio frequency welding, heat bonding, and/or any other suitable technique, or by a combination of suitable techniques.

Referring to FIG. 1B, the airbag 110 includes a primary cushion portion 120 (which may also be referred to as the primary cushion 120) connected to a secondary cushion portion 130 (which may also be referred to as the secondary cushion 130 or the supplemental cushion). The primary cushion 120 may be of any suitable shape and may include any suitable passenger airbag configuration. In some embodiments, the primary cushion 120 may be formed by any suitable arrangement of panels. For example, the panels may be joined or otherwise configured by an adhesive or other suitable bonding mechanism. In other embodiments, the panels may be formed of a single continuous unitary piece of material. The primary cushion 120 may include a side panel facing outboard toward the side door of the vehicle 50, a side panel opposite the first side panel facing inboard toward the interior of the vehicle 50, and one or more additional panels that may connect each of the side panels together to at least substantially enclose or define a first inflatable chamber 122.

As can be appreciated, the secondary cushion 130 may include any suitable shape or configuration. For example, the secondary cushion 130 may be formed of a plurality of separate panels joined along their edges to form a second inflatable chamber 132. Alternatively, the secondary cushion 130 may be formed of a single unitary piece of material that is configured to form the panels and/or sides of the secondary cushion 130. Further, the panels of the secondary cushion portion 130 may at least substantially define and/or enclose a second inflatable chamber 132 of a predetermined volume, which volume may be less than the volume of the first inflatable chamber 122. Additionally, the second inflatable chamber 132 may be configured to be in fluid communication with the first inflatable chamber 122 via a valve 134 disposed in a sidewall separating the first inflatable chamber 122 and the second inflatable chamber 132.

The secondary cushion 130 may be joined to the primary cushion 120 by any suitable manner, such as via one or more seams, adhesives, radio frequency welding, or heat bonding. In some embodiments, a seam that joins a side panel of the primary cushion 120 to another panel of the primary cushion 120 may further join the primary cushion 120 to the secondary cushion 130. For example, a periphery of the secondary cushion 130 may be secured to a side panel of the primary cushion 120 via stitching disposed within the interior of the primary cushion 120. In other embodiments, the two cushions 120, 130 may be individually or collectively formed by a single unitary piece of material.

As illustrated in FIG. 1B, the size of the secondary cushion 130 may be smaller than the size of the primary cushion 120. In other embodiments, the secondary cushion 130 and/or the second inflatable chamber 132 may be sized or shaped differently. For example, the secondary cushion 130 may be equal in size to the primary cushion 120 and/or may extend further toward the vehicle occupant 60 than the primary cushion 120. In yet other embodiments, the secondary cushion 130 may be of greater size than the primary cushion 120 and/or may extend a greater lateral distance toward the interior of the vehicle 50. Other sizes and/or shapes of the secondary cushion 130 may be included when these sizes and/or shapes may be suitable to reduce or minimize injury to the vehicle occupant 60 during a collision event.

When the airbag cushion 110 is completely deployed, the secondary cushion portion 130 may extend laterally inboard, or toward the interior of the vehicle 50, from the primary cushion 120. In some embodiments, the secondary cushion 130 may be configured to extend a distance away from the primary cushion 120 and may be interposed between the vehicle occupant 60 and the IP stack of the instrument panel 70. In these embodiments, the secondary cushion 130 may prevent the vehicle occupant 60 from coming in contact with the IP stack during a collision event.

The primary cushion portion 120 may be configured to receive inflation gas from the inflator 112 during deployment of the airbag 110. When the primary cushion portion 120 receives inflation gas from the inflator 112, the primary cushion portion 120 may burst from the airbag housing 114, and transition from a packaged configuration to a deployed and inflated configuration. Likewise, the secondary cushion portion 130 may be configured to receive inflation gas from the one-directional valve 134 and transition from a packaged configuration to a deployed and inflated configuration. Additionally, the primary cushion portion 120 of the airbag 110 may be configured to deploy and inflate during a collision event, before the secondary cushion portion 130 deploys and inflates. The primary cushion 120 may deploy in a direction toward the vehicle occupant 60 in any suitable manner. For example, the primary cushion portion 120 can deploy generally as a typical passenger airbag, which does not include a supplemental chamber, might deploy. Thus, the secondary cushion portion 130 may be in one-directional fluid communication with the primary cushion portion 120, with the second inflatable chamber 132 able to receive inflation gas directly from the first inflatable chamber 122 via the valve 134. The second inflatable chamber 132 may be said to receive inflation gas indirectly from the inflator 112 via the first inflatable chamber 122. The secondary cushion portion 130 can thereby inflate and expand to a predetermined state of expansion, and transition from a compact configuration to a deployed configuration.

In FIG. 1B, the airbag assembly 100 is shown in a deployed and inflated configuration and may receive the vehicle occupant 60 during a collision event. The occupant 60 is shown seated in a seat 54 configured to accommodate a single person. The seat 54 may provide a well-defined vehicle occupant region 57, which may also be referred to herein as a vehicle occupant position, within which the vehicle occupant 60 is generally positioned while in the seat 54. As previously mentioned, the primary cushion portion 120 can be configured to deploy directly in front of the vehicle occupant region 57 and/or toward the vehicle occupant region 57. Alternatively, the deployment of the primary cushion portion 120 may follow a trajectory that is not in a straight line toward the vehicle occupant region 57, such as by expanding upwardly toward a windshield 52 of the vehicle 50 and/or downwardly toward a floor of the vehicle 50. However, a general deployment of the primary cushion portion 120 may nevertheless be generally rearward toward the vehicle occupant region 57.

The forces present in some collision events may cause the occupant 60 to move in a substantially forward direction (depicted by the arrow 40) and toward the instrument panel 70, in which case the primary cushion portion 120 may receive the vehicle occupant 60 in a typical fashion. In other instances, the forces of a collision event may cause the occupant 60 to move in both the forward direction 40 and an inboard direction (e.g., toward the interior or center of the vehicle 50 or toward the driver side of the vehicle, in an oblique direction relative to the forward direction 40). The secondary cushion 130 can provide an additional cushioning region to receive the occupant 60 in such instances. For example, in some circumstances, the occupant 60 may miss the primary cushion portion 120 but may be received by the secondary cushion portion 130. In other or further circumstances, the vehicle occupant 60 may engage an inboard corner of the primary cushion 120 and cause the primary cushion 120 to roll, such that the vehicle occupant 60 does not fully engage the primary cushion portion 120, and the vehicle occupant 60 may then be received by the secondary cushion portion 130. In still other or further circumstances, the secondary cushion portion 130 may stabilize the primary cushion portion 120 to make the primary cushion portion 120 resistant to rolling or otherwise missing the occupant 60 as the occupant 60 travels in an angled (oblique) forward and inboard direction. As the vehicle occupant impacts and rides down the primary cushion portion 120, inflation gas may be driven forcefully from the first inflatable chamber 122 into the second inflatable chamber 132. Because of venting from the primary cushion portion 120, the pressure in the second inflatable chamber 132 of the secondary cushion portion 130 increases and a much higher pressure can be achieved within the secondary cushion portion 130 as compared to the primary cushion portion 120.

Figure 2A:
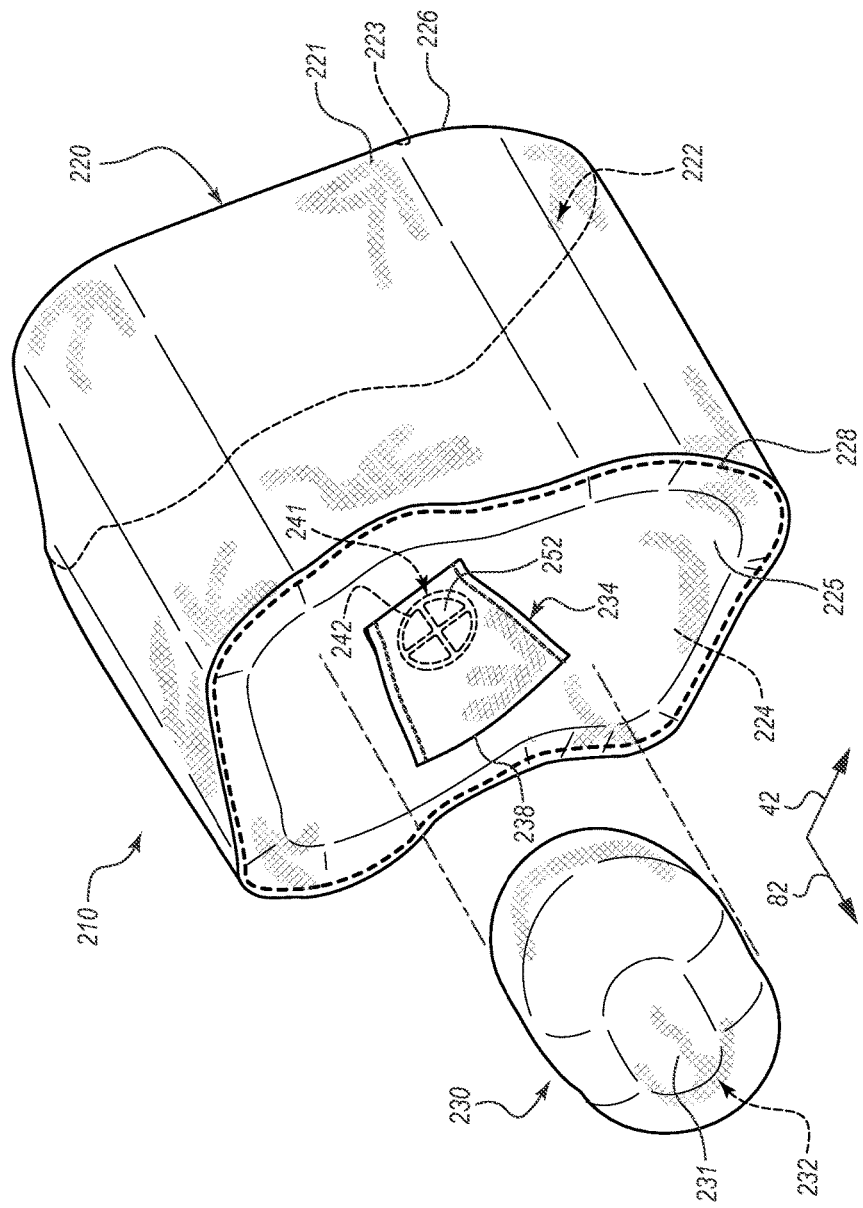
FIG. 2A is an exploded perspective view of a multi-chamber airbag of an airbag assembly, with a primary cushion and a supplemental cushion both shown in an expanded state. A vent with a valve provides one-directional flow of gas between the pair of inflatable chambers.
Figure 2B:
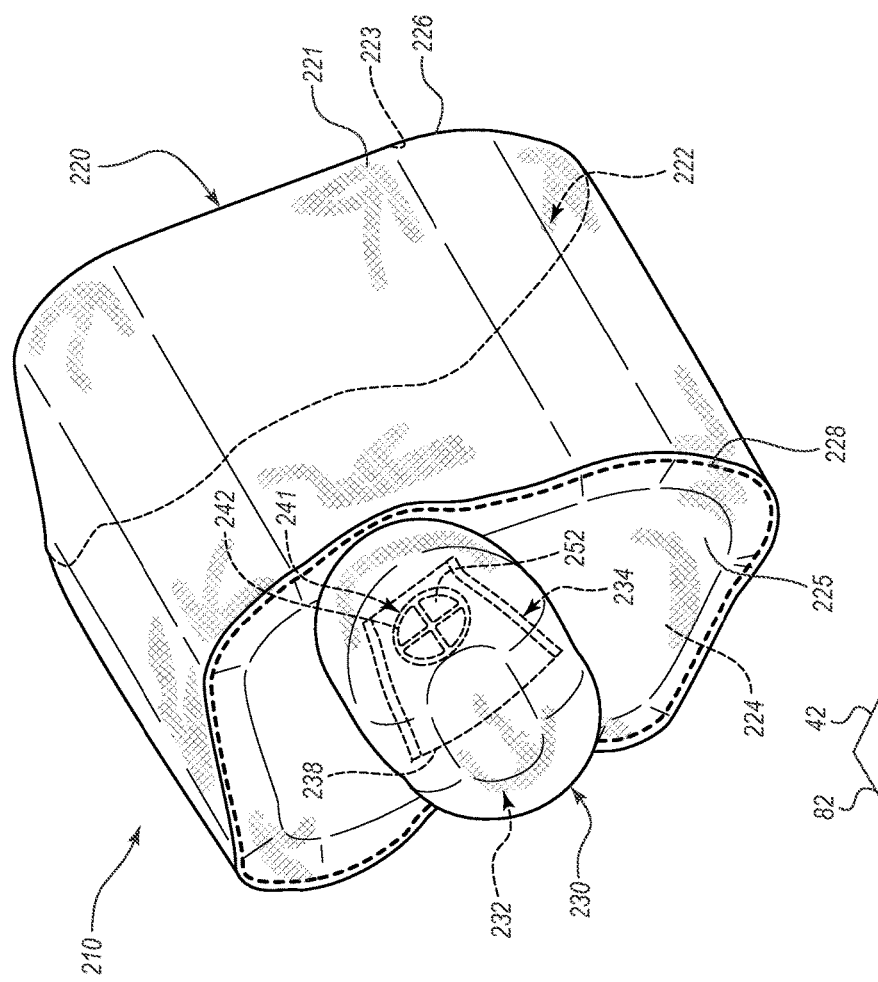
FIG. 2B is a perspective view of the multi-chamber airbag in the assembled state shown in FIG. 2A with the primary cushion and the supplemental cushion in an expanded state.

FIGS. 2A and 2B depict another embodiment of an airbag 210 that can resemble the airbag 110, described above, in certain respects. Accordingly, like features are designated with like reference numerals, with the leading digits incremented to "2." Relevant disclosure set forth above regarding similarly identified features thus may not be repeated hereafter. Moreover, specific features of the airbag 210 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag 210. Any suitable combination of the features and variations of the same described with respect to the airbag 110 can be employed with the airbag 210, and vice versa. Similarly, the airbag 210 can be used with any suitable airbag assembly, including the airbag assembly 100 discussed above. This pattern of disclosure applies equally to further embodiments depicted in subsequent figures and described hereafter, wherein the leading digits may be further incremented.

FIG. 2A is an exploded perspective view of a multi-chamber airbag 210 of an airbag assembly, according to one embodiment. The multi-chamber airbag 210 includes a first cushion portion 220, a second cushion portion 230 (both shown in an expanded and inflated configuration) and a one-directional valve 234 that may provide one-way fluid communication between an inflatable chamber 222 of the first cushion portion 220 (referred to as the first inflatable chamber 222) and an inflatable chamber 232 of the second cushion portion 230 (referred to as the second inflatable chamber 232).

In the illustrated embodiment of FIG. 2A, the first cushion portion 220 includes a rear panel 221 (which may form or be part of a main panel), a front panel 224, a first side panel 223, and a second side panel 225. The first side panel 223 is joined to the rear panel 221 at the seam 226, and the second side panel 225 is joined to the rear panel 221 at the seam 228. Similarly, the first side panel 223 and the second side panel 225 may be joined to the front panel 224 at one or more seams. The seams 226, 228 and may be of any suitable variety, whether sealed or unsealed seams, and may be formed via stitching, one or more adhesives, taping, welding (e.g., radio frequency welding), heat bonding, or any other suitable technique or combination of techniques. The panels 221, 223, 224, 225 may form cushion sidewalls of the first cushion portion 220. The panels 221, 223, 224, 225 may be formed of any suitable material. For example, in some embodiments, panels are formed of woven nylon fabric. Moreover, a variety of types and configurations of airbag panels can be utilized in various embodiments. For example, the size, shape, proportions, number, and connectivity of the panels may vary in different embodiments. Some embodiments may be tailored for use in different vehicles and/or for different locations within a vehicle 50.

The second cushion portion 230 may also include one or more panels 231 that may be integrally formed or otherwise joined together at one or more seams to form the second inflatable chamber 232. The one or more panels 231 may form cushion sidewalls of the second cushion portion 230. The second cushion portion 230 may be attached to the side panel 225 of the first cushion portion 220 in any suitable manner. In the illustrated embodiment of FIGS. 2A and 2B, the side panel 225 may be shared by both the first cushion portion 220 and the second cushion portion 230. Accordingly, a portion of the side panel 225 may separate the first inflatable chamber 222 from the second inflatable chamber 232 and may also be referred to herein as a partition. The cushion portions 220, 230 may be attached by a seam spaced from a perimeter seam such that the periphery of the second cushion portion 230 is secured to the side panel 225 of the first cushion portion 220 via the stitching at a position internal to the periphery of the side panel 225 of the first cushion portion 220. In other embodiments, at least a portion of the second cushion portion 230 may be joined to the first cushion portion 220 via a perimeter seam (e.g., seam 228).

Described otherwise, the cushion side panel 225 may be part of the first cushion portion 220 of the airbag 210, and the cushion side panel 225 may be shared with the second cushion portion 230, such that the cushion side panel 225 of the first cushion portion 220 of the airbag 210 may include a surface that is both exterior to the first inflatable chamber 222 and, at least partially, interior to the second inflatable chamber 232. In other words, the cushion side panel 225 may also be a panel or portion of the second cushion portion 230.

A vent 241 may allow fluid communication and, therefore, gas to flow between the inflatable chambers 222, 232. The vent 241 may comprise a vent aperture 242, or a plurality of vent apertures 242, in the side panel 225 of the first cushion portion 220 and through any sidewall panel 231 of the second cushion portion 230. Gas flow through the vent aperture 242 may be regulated, or otherwise restricted, to one-directional flow by a valve 234. The valve 234 depicted in FIGS. 2A and 2B is disposed on the side panel 225 of the first cushion portion 220, internal to the second inflatable chamber 232, to limit gas flow through the vent aperture 242 in a single direction from the first inflatable chamber 222 into the second inflatable chamber 232. More specifically, while in an open configuration, the one-directional valve 234 may provide one-way venting of inflation gases from the first inflatable chamber 222 to the second inflatable chamber 232, and when in a closed configuration, the one-directional valve 234 may prevent backflow of inflation gases from the second inflatable chamber 232 to the first inflatable chamber 222. The valve 234 includes a valve aperture 252 that aligns with the vent aperture 242 to receive inflation gas into the valve 234. A valve opening 238 disposed within the second inflatable chamber 232 allows gas to pass into the second inflatable chamber 232 while restricting gas from flowing back from the second inflatable chamber 232 into the valve 234 and to the valve aperture 252 and vent aperture 242.

Inflation gas may flow from the first inflatable chamber 222 into the second inflatable chamber 232 during deployment of the airbag 210. The second cushion portion 230 may inflate and expand as the corresponding pressure of the second inflatable chamber 232 increases. Eventually, a sufficient amount of inflation gas may flow to the second inflatable chamber 232 to raise the pressure within the second inflatable chamber 232 above the pressure in the first inflatable chamber 222 and cause the valve opening 238 of the one-directional valve 234 to close. With the valve opening 238 of the one-directional valve 234 closed, the inflatable chambers 222, 232 are no longer in fluid communication and inflation gases within the second inflatable chamber 232 are isolated (or nearly isolated) from inflation gases within the first inflatable chamber 222. Accordingly, impact of an occupant with the second cushion portion 230 will not result in a shift of inflation gases from the second inflatable chamber 232 to the first inflatable chamber 222. The integrity and/or restraint capability of the second cushion portion 230 is retained independent of a further decrease of pressure within the first inflatable chamber 222 of the first cushion portion 220.

In certain embodiments, the second cushion portion 230 of the airbag 210 may be devoid of external vents, and the second inflatable chamber 232 may be isolated from external gases while the one-directional valve 234 is closed. In other embodiments, the first cushion portion 220 of the airbag 210 may also be devoid of external vents.

The first cushion portion 220 of the multi-chamber airbag 210 illustrated in FIGS. 2A and 2B may deploy in a first direction indicated by arrow 42 (e.g., toward an occupant). FIG. 2B illustrates that the second cushion portion 230 may deploy in a second direction indicated by arrow 82, for example, laterally from the first cushion portion 220. In certain embodiments, the second direction 82 may be orthogonal, or substantially orthogonal, to the first direction 42. The second direction 82 may be laterally inboard along a dashboard of a vehicle 50, for example, to cover a portion of the dashboard laterally spaced closer to an interior and/or a centerline of the vehicle 50 from a portion of the dashboard that is covered by the first cushion portion 220.

In certain embodiments, the second cushion portion 230 may deploy in a second direction that may be downward (e.g., such as in a knee airbag). In other embodiments, the second cushion portion 230 may deploy in a second direction that may be laterally outboard, toward the outside of the vehicle 50.

The side panel 225 of the airbag 210 may form a partition or barrier that may separate the two inflatable chambers 222, 232. In certain embodiments, the side panel 225 may be shared by both inflatable chambers 222, 232, as illustrated in FIGS. 2A and 2B. In other embodiments of the airbag 210, the first cushion portion 220 may not include a side panel 225, but rather the corresponding sidewall may be defined by a panel of the second cushion portion 230.

The cushion side panel 225 may facilitate or otherwise enable inflation of the two inflatable chambers 222, 232, or may facilitate the transition of the first cushion portion 220 and/or the second cushion portion 230 from a packaged state to an expanded state by restricting flow of inflation gas between the inflatable chambers 222, 232. The vent 241 may be disposed at any suitable position in the cushion side panel 225 to allow inflation gas to flow from the first inflatable chamber 222 to the second inflatable chamber 232. As described above, the vent 241 may include a vent aperture 242 defined through a first surface of the side panel 225 that is interior to the first inflatable chamber 222 and a second surface of the side panel 225 directly opposite the first surface and interior to the second inflatable chamber 232. The cushion side panel 225 may facilitate control of the flow of inflation gas between the inflatable chambers 222, 232 by restricting the flow of inflation gas between the two inflatable chambers 222, 232 to occur only through the vent aperture 242, and thereby through the one-directional valve 234.

FIG. 3A is a close-up perspective view of a one-directional valve 334 during a stage of a method of manufacture according to one embodiment, before coupling a first valve layer 346 to a sidewall 325 of an inflatable chamber. The one-directional valve 334 may be configured to be disposed at an interior of an inflatable chamber (e.g., the second inflatable chamber 232 of the second cushion portion 230 shown in FIGS. 2A and 2B). The valve 334 may include a valve aperture 352, a first valve layer 346 or panel, and a second valve layer 348 or panel.

The valve aperture 352 is disposed in or otherwise defined by the first valve layer 346. The valve aperture 352 is configured to align with the corresponding vent aperture 342, as shown in FIG. 3B and described below with reference to the same. The alignment of the apertures 342, 352 may facilitate the flow of inflation gas from the one directional valve 334 into the second inflatable chamber. The valve aperture 352 may correspond to the vent aperture 342 in size, shape, and/or position in the first valve layer 346. For example, the size of the valve aperture 352 may be roughly equal to the size of the corresponding vent aperture 342. Alternatively, the size of the valve aperture 352 may be greater, in some embodiments, than the comparative size of the vent aperture 342. The apertures 342, 352 may be of any suitable shape that may facilitate alignment. In the illustrated embodiment of FIG. 3A, the apertures 342, 352 include a plurality of holes formed to define a grated circle. In the illustrated embodiment of FIG. 3A, the apertures 342, 352 include webs or bars of fabric crossing or intersecting what may be considered a single vent aperture. The webs or bars may prevent the second valve layer 348 from pushing into the apertures 342, 352, which may distort the valve 334 and allow leakage between the first valve layer 346 and the second valve layer 348 when back pressure occurs. Four bars are depicted but 3, 5, 6, 7 or 8 bars, may also be used. In other embodiments, the a different shape for the apertures 342, 352 may be used, or a size, number, arrangement, and the like, from what is shown. Further, the valve aperture 352 may be disposed at any suitable point in the first valve layer 346.

The first valve layer 346 and/or the second valve layer 348 may be formed of a sheet of material, such as a textile material, a polymer material, or the like. For example, the first valve layer 346 and/or the second valve layer 348 may be formed of a fabric that is coated, such as with rubber, silicone, plastic, or the like. The material may be the same as or similar to the material of the chamber sidewall 325. In the illustrated embodiment, the first valve layer 346 and the second valve layer 348 are integrally connected and/or formed from a single piece of material that is folded over on itself to form the two layers 346, 348. In other embodiments, the first valve layer 346 and the second valve layer 348 may be formed of separate and distinct pieces of material.

FIG. 3B depicts the valve 334 of FIG. 3A at another stage of the method of manufacture, in which the vent aperture 342 and the valve aperture 352 are aligned. The first valve layer 346 or panel of the one-directional valve 334 is shown disposed adjacent to and/or in abutment with a chamber sidewall 325, with the apertures 352, 342 aligned. The apertures 342, 352 may be shaped to require a specific alignment of the first valve layer 346 relative to the chamber sidewall 325. In such embodiments, the position of the first valve layer 346 may facilitate aperture alignment and connecting the first valve layer 346 and chamber sidewall 325.

The first valve layer 346 may be of any suitable size or shape. A suitably sized first valve layer 346 may include sufficient surface area to define the valve aperture 352 to correspond to the vent aperture 342 and to be connected to the chamber sidewall 325. Moreover, the first valve layer 346 may be of any suitable shape to include the aforementioned surface area. For example, the first valve layer 346 may be square, rectangular, trapezoidal, or any suitable polygonal shape.

Figure 3D:
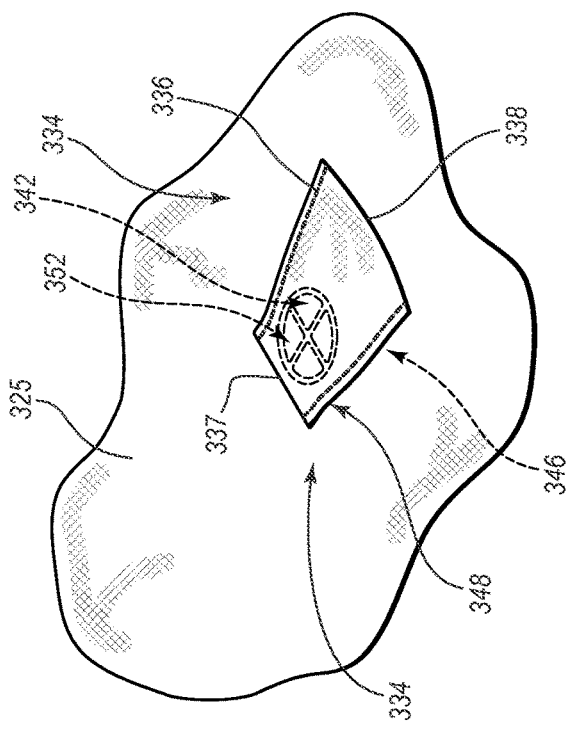
FIG. 3D shows the one-directional valve of FIG. 3A at another stage of the manufacturing process, with the second valve layer secured to the first valve layer.
Figure 3C:
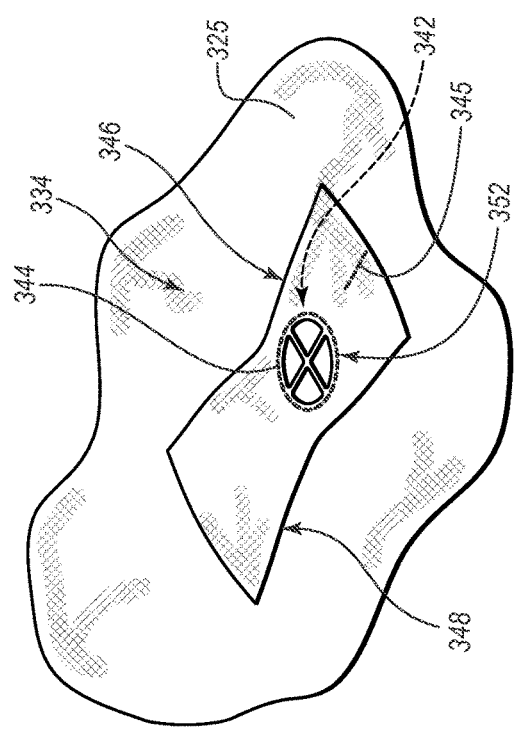
FIG. 3C shows the one-directional valve of FIG. 3A at another stage of the manufacturing process, with the first valve layer secured to the chamber sidewall.

FIG. 3C depicts the one-directional valve 334 of FIG. 3A in a still later stage of manufacture, with the first valve layer 346 secured to the chamber sidewall 325. The first valve layer 346 of the illustrated embodiment is connected to the chamber sidewall 325 by stitching 344 disposed along a perimeter of the valve aperture 352 and the vent aperture 342. More specifically, a first portion of the first valve layer 346 adjacent or surrounding the valve aperture 352 may be secured in a fixed position relative to the chamber sidewall 325, while a second portion of the first valve layer 346 may remain free, unsecured from the chamber sidewall 325 except by coupling of the first portion of the first valve layer 346. Stated otherwise, a portion of the first valve layer 346 near the valve aperture 352 may be fixed to the chamber sidewall 325 while a portion of the first valve layer 346 near the valve opening 338 remains unfixed, although coupled to the chamber sidewall 325 through the portion near the valve aperture 352. Accordingly, the valve opening 338 can operate freely, separate from tension and/or forces on the chamber sidewall 325. As the chamber sidewall 325 expands during inflation of a first inflatable chamber and/or a second inflatable chamber, the chamber sidewall 325 may assume an uneven shape that can present challenges to total closure of previously available check valves when back pressure occurs. By contrast, in the present embodiments, two independent valve layers 346, 348 allow the valve 334 to open and close independently of the chamber sidewall 325 and any other surrounding chamber sidewalls.

The first valve layer 346 may be secured to a surface of the chamber sidewall 325 exterior to the first inflatable chamber and interior to a second inflatable chamber. Stated otherwise, the one-directional valve 334 is configured to be positioned within a receiving inflatable chamber to which a one-directional flow of gas is to be received.

Although a portion of the first valve layer 346 near the valve opening 338 remains generally unfixed to the sidewall 325, in certain embodiments securement stitching 345 at a position a distance from the aperture may secure the first valve layer 346 from moving toward the valve aperture 352 during back pressure. This securement stitching 345 limits the open edge or valve opening 338 of the valve 334 from being pushed into the valve aperture 352, which would result in pressure leakage back into the first inflatable chamber. The securement stitching 345 may be a single tack stitch at a position a distance from the valve aperture 352, such as at an end of the first valve layer 346 forming the valve opening 338. Stated differently, the first valve layer 346 can be sewn to the sidewall 325 around the vent aperture 352 only, except for a small tack stitch 345. And as described more fully below, the second valve layer 348 can be positioned to overlay the first valve layer 346 so that the lateral edges of the first and second valve layers 346, 348 can be sewn together, but not sewn to the chamber sidewall 325.

As can be appreciated, other coupling forms besides stitching may be possible. For example, the first valve layer 346 of the illustrated embodiment may be connected to the chamber sidewall 325 by glue, heat bonding, adhesive, taping, radio frequency welding, and/or the like, around a perimeter of the valve aperture 352 and the vent aperture 342.

FIG. 3D depicts the one-directional valve 334 of FIG. 3A at another stage of the method of manufacture. The first valve layer 346 of the one-directional valve 334 is connected to the chamber sidewall 325, and the second valve layer 348 is folded over the first valve layer 346 to overlay and cover both a portion of the first valve layer 346 and the entire valve aperture 352. The second valve layer 348 is secured to or otherwise connected to the first valve layer 346 by stitching 336 that is disposed along the lateral edges of the second valve layer 348. The stitching 336 may be omitted along one or more of the edges of the second valve layer 348 to forming a valve opening 338 between the two valve layers 346, 348. The stitching 336 along the lateral edges of the valve layers 346, 348, in combination with the fold 337 between the valve layers 346, 348, forms a pocket or valve chamber 339 (see FIG. 4A) that receives inflation gas through the valve aperture 352. In the illustrated valve 334, the valve aperture 352 is disposed deep in the valve chamber 339, nearer the fold 337 and away from the valve opening 338. The unstitched and open lateral edge of the valve layers 346, 348 forms the valve opening 338 that releases inflation gas from the valve chamber 339 into the receiving inflatable chamber, such as a secondary chamber of a multi-chamber airbag.

As can be appreciated, the second valve layer 348 may be joined to the first valve layer 346 along one or more edges of the second valve layer 348 by any suitable means. Some embodiments may include stitching 336, an adhesive, heat sealing, radio frequency welding, or any combination of these and/or other suitable means of connection. Similarly, the second valve layer 348 may be formed of a separate piece of material from the first valve layer 346, such that the fold 337 is replaced with stitching or other means to join or connect the lateral edges of the second valve layer 348 to the lateral edges of the first valve layer 346.

A method of manufacturing a multi-chamber airbag, according to one embodiment, may include: forming a first inflatable cushion portion using one or more first cushion panels to define a first inflatable chamber; forming a second inflatable cushion portion using one or more second cushion panels to define a second inflatable chamber; forming a vent aperture in one or more cushion channels disposed between the first inflatable chamber and the second inflatable chamber, the vent aperture to vent inflation gas received from an inflator from the first inflatable chamber to the second inflatable chamber; forming a valve aperture in a first valve panel, the valve aperture corresponding to the vent aperture; securing the first valve panel within the second inflatable chamber to a cushion panel adjacent the vent aperture, with the valve aperture and the vent aperture aligned; securing a second valve panel overlaying the first valve panel, including the valve aperture, along one or more edges of the second valve panel, wherein the second valve panel remains unsecured to the first valve panel along at least one edge of the second valve panel to form a valve opening between the first valve panel and the second valve panel, wherein the second valve panel is configured to part from the first valve panel at the valve opening to allow inflation gas to flow from the valve aperture through the valve opening, and wherein the second valve panel is configured to collapse against the first valve panel to close the valve opening when a pressure in the second inflatable chamber exceeds a pressure in the first inflatable chamber to restrict air flow from the second inflatable chamber into the first inflatable chamber.

Figure 4B:
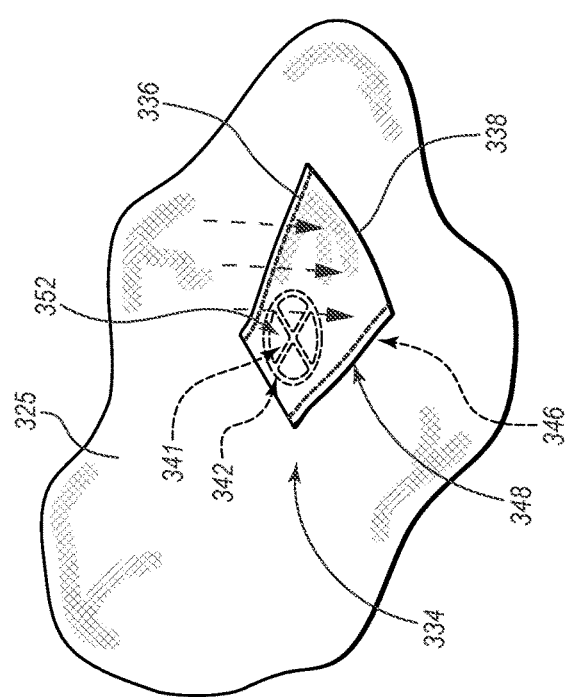
FIG. 4B shows the one-directional valve of FIGS. 3A-3D in a closed configuration.
Figure 4A:
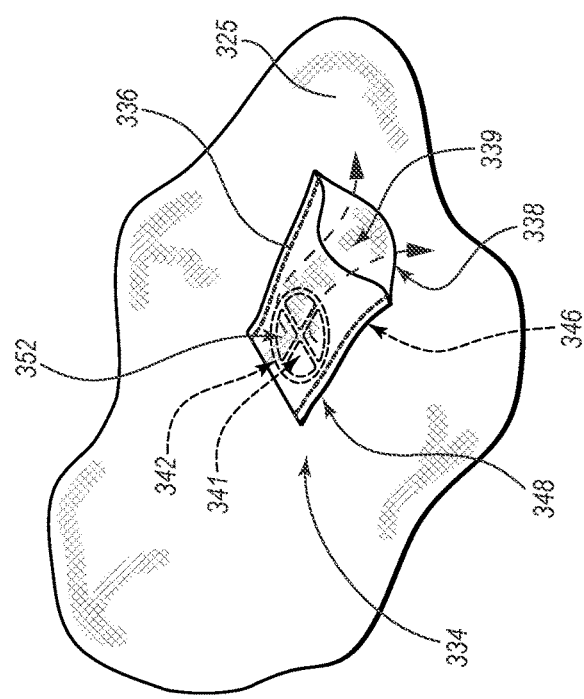
FIG. 4A shows the one-directional valve of FIGS. 3A-3D in an open configuration.

FIG. 4A shows the one-directional valve 334 of FIGS. 3A-3D in an open configuration. The one-directional valve 334 may be positioned within a receiving inflatable chamber (e.g., the second inflatable chamber 232 described above with reference to FIGS. 2A and 2B) and may be configured to open to allow inflation gas to pass from a primary inflatable chamber (e.g., the first inflatable chamber 222 described above with reference to FIGS. 2A and 2B). When a pressure of inflation gas coming in through the valve aperture 352 (e.g., the pressure within the primary inflatable chamber) is higher than a pressure within the receiving inflatable chamber, the valve chamber 339 fills with inflation gas, the two valve layers 346, 348 part or otherwise separate at the valve opening 338, and the valve 334 is in the open configuration. The valve 334 closes when a pressure of the receiving inflatable chamber exceeds the pressure of the inflation gas coming in through the valve aperture 352 (e.g., the pressure within the primary inflatable chamber).

More specifically, the one-directional valve 334 of FIG. 4A may be included in a multi-chamber airbag of an airbag assembly. During initial deployment, an airbag assembly transitions from a compact configuration to a deployed and inflated configuration, and a first inflatable chamber may receive inflation gas directly from an inflator and rapidly fill with a volume of inflation gas. The flow of inflation gas into the first inflatable chamber may cause the pressure in the first inflatable chamber to exceed the pressure in a second inflatable chamber. The difference in pressure between the chambers may cause the one-directional valve 334 to be disposed in the open configuration shown in FIG. 4A. More specifically, the increasing volume of inflation gas within the first inflatable chamber may exert a force upon the one-directional valve 334 through the apertures 342, 352. As a result, the valve layers 346, 348 of the one-directional valve 334 may at least marginally separate along the valve opening 338, primarily via extension of the second valve layer 348 some distance away from the first valve layer 346. With the valve layers 346, 348 separated, the one-directional valve 334 is open (i.e., in an open configuration) and the two inflatable chambers may be in fluid communication. Specifically, with the one-directional valve 334 open, inflation gas may flow from the valve aperture 352, through the valve opening 338, and into the second inflatable chamber, and may at least partially inflate the second inflatable chamber with inflation gas. As the volume of inflation gas contained in the second inflatable chamber increases, the corresponding pressure present in the second inflatable chamber may likewise increase.

As described previously, the second valve layer 348 of the one-directional valve 334 may be configured to extend some distance away from the first valve layer 346 and into the second inflatable chamber to configure the one-directional valve 334 to be open and place the two inflatable chambers in fluid communication. The first valve layer 346 and the second valve layer 348 may be configured to part or separate at the valve opening 338 based on a length of material disposed between the stitching 336 (or other coupling means securing the second valve layer 348 to the first valve layer 346). An appropriate quantity of loose or slack valve layer material may permit the valve opening 338 of the one-directional valve 334 to open and allow gas flow through the vent aperture 342 of the vent 341 without resistance.

In some embodiments, the valve aperture 352 and vent aperture 342 may be configured to limit or facilitate the flow rate of inflation gas from the first inflatable chamber to the second inflatable chamber. Or, in other words, the one-directional valve 334 may be configured by any suitable means, for example the size of the valve aperture 352, to restrict or facilitate the flow rate of inflation gas through the one-directional valve 334 to some predetermined value. This control of gas flow rate may further facilitate control of the rate at which the second inflatable chamber fills with inflation gas and transitions into an expanded state following deployment of an airbag.

FIG. 4B shows the one-directional valve 334 of FIG. 4A in a closed configuration. As described, the one-directional valve 334 is configured to close when a sufficient volume of inflation gas has flowed from the valve aperture 352 into the receiving inflatable chamber. After the flow of a sufficient volume of gas, the pressure present in the receiving inflatable chamber may exceed the pressure of inflation gas flowing through the valve aperture 352 and/or the pressure present in a primary inflatable chamber. As a result, the pressure of the receiving inflatable chamber may cause the second valve layer 348 to collapse onto first valve layer 346.

In FIG. 4B, the one-directional valve 334 may be part of a multi-chamber airbag of an airbag assembly, shown sometime after deployment, when the pressure of the second inflatable chamber may exceed the pressure of the first inflatable chamber, causing the one-directional valve 334 to be closed.

Causing the valve opening 338 to close, or the one-directional valve 334 to be in a closed configuration, may restrict and prevent gas flow between the two inflatable chambers. When the one-directional valve 334 is closed, the contents of the two inflatable chambers may be isolated from each other. The isolation of the chambers created by the closed one-directional valve 334 may allow the respective pressures of the two inflatable chambers to be retained. Thus, the valve opening 338 may remain in the closed configuration until the pressure present in the primary inflatable chamber at least marginally exceeds the pressure present in the receiving inflatable chamber.

The valve opening 338, and more particularly the ends of the first and second valve layers 346, 348 forming the valve opening 338, is operable independent of the chamber sidewall 325. Accordingly, any impact on the valve 334 is minimized that may be caused by tension in the chamber sidewall 325 and/or forces, movement, or any other factors impacting the chamber sidewall 325. The ends of the first and second valve layers 346, 348 forming the valve opening 338 are able to readily collapse, and even tend to collapse, when pressure in the receiving inflatable chamber exceeds inflation gas pressure into the vent aperture 342. In other words, the second valve layer 348 can readily collapse against the first valve layer 346 to halt flow of gas backward, in an opposite direction, through the vent aperture 342. The one-directional valve 334 can transition to the closed configuration to check flow of gas in a reverse direction, as configured, regardless of conditions that may exist with respect to the chamber sidewall 325 that may otherwise impact a traditional valve that operates in cooperation with (or dependent on) the chamber sidewall 325.

As can be appreciated, the second valve layer 348 may be of any suitable shape. Suitable shapes of the second valve layer 348 may facilitate the one-directional control of the flow of inflation gas, by allowing the second valve layer 348 to completely cover the valve aperture 352 and first valve layer 346 when the one-directional valve 334 is in a closed configuration. The second valve layer 348 may further be shaped to allow the valve opening 338, defined by the shape and size of an unsecured edge of the second valve layer 348, to permit a predetermined flow rate of inflation gas between the two inflatable chambers.

Figure 5:
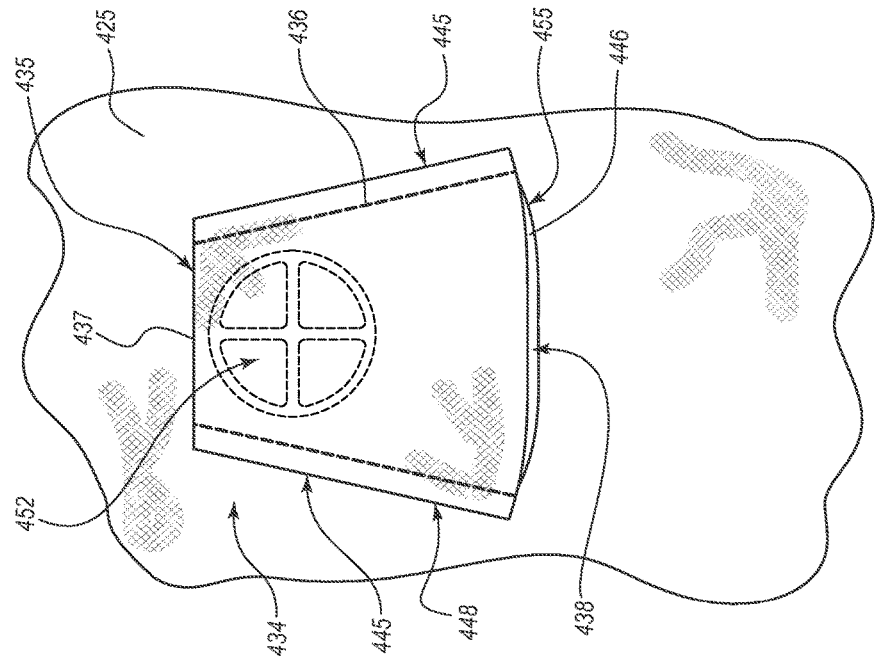
FIG. 5 is a one-directional valve according to another embodiment.

FIG. 5 illustrates a one-directional valve 434, according to another embodiment. The one-directional valve 434 has a trapezoidal shape. The valve 434 includes a first valve layer 446, a second valve layer 448, and a valve aperture 452 disposed in the first valve layer 446. The first valve layer 446 may be secured to a cushion sidewall 425 by one or more seams along the edge or perimeter of the valve aperture 452. The second valve layer 448 may overlay the first valve layer 446 and valve aperture 452 and be connected to the first valve layer 446 along one or more lateral edges, forming two or more angled valve sides 445. In some embodiments, the first valve layer 446 and the second valve layer 448 may be formed by a single unitary piece of material that is folded at a fold 437 along one boundary of the two valve layers 446, 448. The fold 437 may form a first valve side 435 that is shorter than an opposite valve side 455 at which a valve opening 438 is disposed. Thus, the one-directional valve 434 may be trapezoidal in shape, formed by the valve opening 438, the first valve side 435 opposite the valve opening 438, and two angled valve sides 445 formed by a perimeter of the second valve layer 448 that is secured to the first valve layer 446 by stitching 436.

As can be appreciated, in other embodiments, the length of the angled valve sides 445 may be greater than shown in the embodiment of FIG. 5. Further, the angle formed by the angled valve sides 445 may be of any suitable value, with a larger angle corresponding to an increase of the length of the valve opening 438, and a smaller anger corresponding to a decrease in the length of the valve opening 438. Further, the angle may be of any suitable value for a particular length of the angled valve sides 445, to produce a corresponding length of the valve opening 438.

Figure 6:
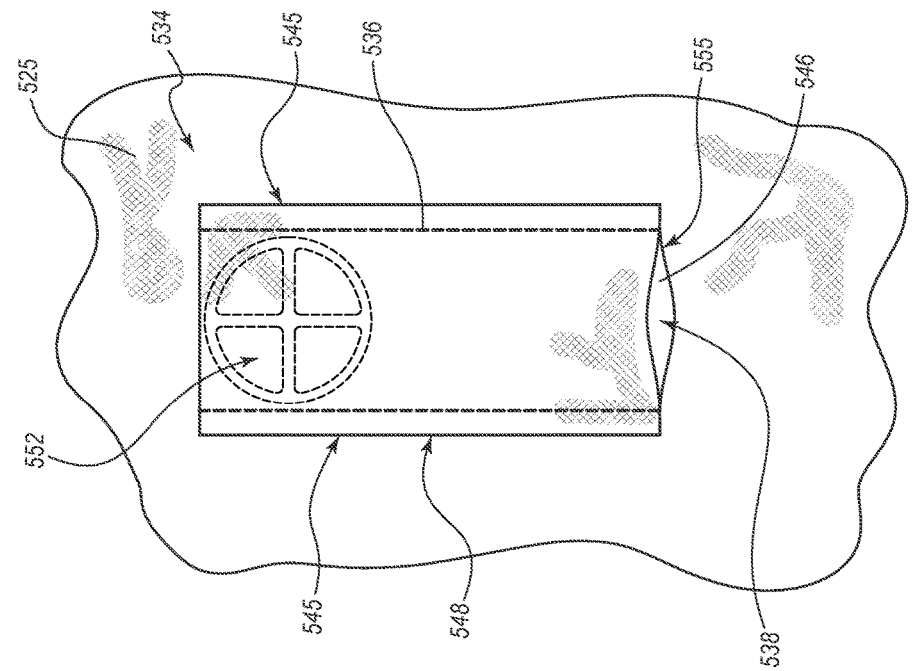
FIG. 6 is a one-directional valve according to another embodiment.

FIG. 6 illustrates a one-directional valve 534 according to another embodiment, secured to a chamber wall 525 of a receiving inflatable chamber. The one-directional valve 534 of FIG. 6 has a rectangular shape and includes four valve sides defined along a perimeter of a first valve layer 546 and a second valve layer 548. The second valve layer 548 is connected to the first valve layer 546. The one-directional valve 534 may include two lateral valve sides 545 that are parallel to each other and that are perpendicular to an end valve side 555 at the valve opening 538, or perpendicular to an end valve side 535 opposite the valve opening 538. The lateral valve sides 545 have a length that is greater than the length of the valve opening 538. The lateral valve sides 545 may be configured to cause the shape of the one-directional valve 534 to be rectangular.

In some embodiments, the length of the lateral valve sides 545 may be greater than the length of the end valve sides 535, 555 as shown in FIG. 6, and may create a greater distance between the valve aperture 552 and the valve opening 538. In other embodiments, the length of the lateral valve sides 545 may be less than the length of the end valve sides 535, 555 and may create a smaller distance between the valve aperture 552 and the valve opening 538 than in the embodiment of FIG. 6. Additionally, in some embodiments, the valve aperture 552 may be disposed closer to a center of the one-directional valve 534, displaced some distance from the closed end valve side 535 as well as from the valve opening 538.

Figure 7:
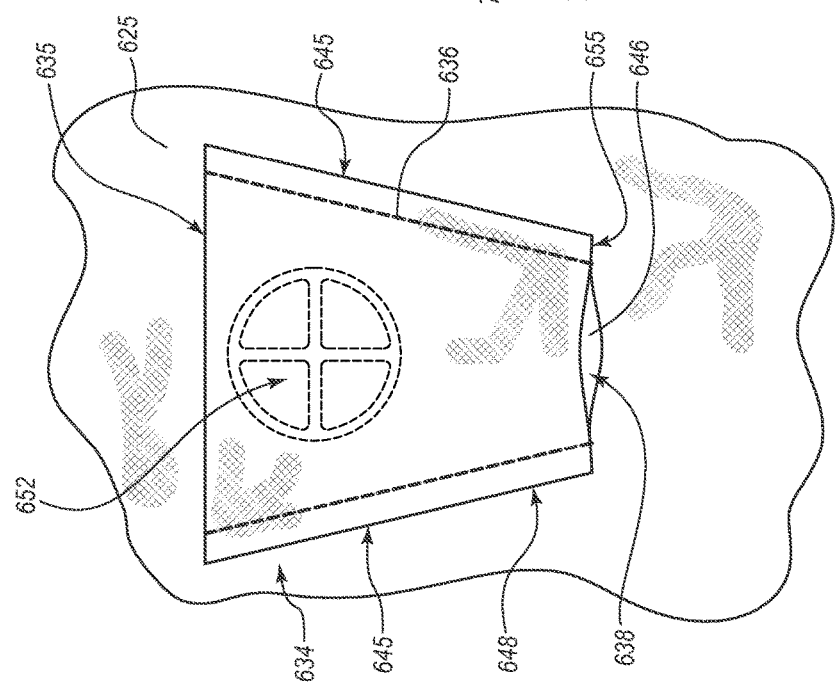
FIG. 7 is a one-directional valve according to another embodiment.

FIG. 7 depicts a one-directional valve 634, according to another embodiment, secured to a chamber wall 625 within a receiving inflatable chamber. The one-directional valve 634 has a roughly trapezoidal shape and includes four valve sides defined along a perimeter of a first valve layer 646 and a second valve layer 648. The second valve layer 648 is connected to the first valve layer 646. The one-directional valve 634 includes a first end valve side 635 opposite a valve side 655 at which a valve opening 638 is disposed, and two angled valve sides 645 that each form an acute or converging angle with the first end valve side 635. The angled valve sides 645 approach one another, or converge, as they approach the valve opening 638, causing the length of the valve opening 638 to be smaller than the length of the first end valve side 635.

In some embodiments, the length of the angled valve sides 645 may be greater than the length of the valve opening 638 or the first valve side 635. The angle formed by the angled valve sides 645 may be of any suitable value, with a larger angle increasing the length of the valve opening 638 relative to the first end valve side 635, and a smaller angle decreasing the length of the valve opening 638 relative to the first end valve side 635. Further, the angle may be of any suitable value to produce a suitable length of the valve opening 638 for a particular angled valve side length, which angled valve side length may be a larger or smaller length than the length of the angled valve sides 645 shown in the embodiment of FIG. 7.

Figure 8:
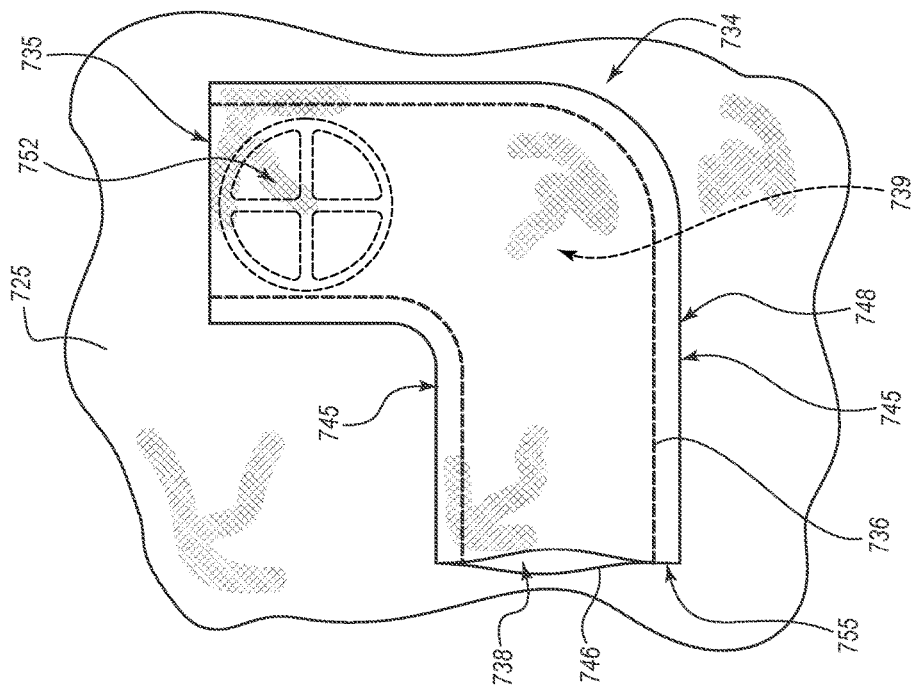
FIG. 8 is an angled one-directional valve according to another embodiment.

FIG. 8 shows a one-directional valve 734, according to another embodiment, including an angled valve gas channel 739 (e.g., also a valve chamber or pocket). The one-directional valve 734 of the embodiment has a polygonal shape and is secured to a sidewall 725 of a receiving inflatable chamber. The one-directional valve 734 may include a first valve side 735, an opposite valve side 755, at which a valve opening 738 is disposed, and two angled valve sides 745 that form an angle (e.g., a 90 degree angle) at or near their midpoints. The first valve side 735 and the angled valve sides 745 may be defined in any suitable manner, such as described in previous embodiments.

The length or width of the one-directional valve 734 may differ from that illustrated in the embodiment of FIG. 8. Further, the valve 734 may form a polygonal shape differing from the shape of the one-directional valve 734. For example, in some embodiments the angle formed by the angled valve sides 745 may be greater than 90 degrees. In other embodiments, the valve may include a valve channel with two valve openings, which may be opposite one another disposed on the same side of the valve aperture 752, or may instead be disposed on opposing sides of the valve aperture 752. In yet other embodiments, the gas channel may separate at some point along the length of the gas channel, splitting off into two or more separate gas channels that may each include an individual valve opening.

Figure 9:
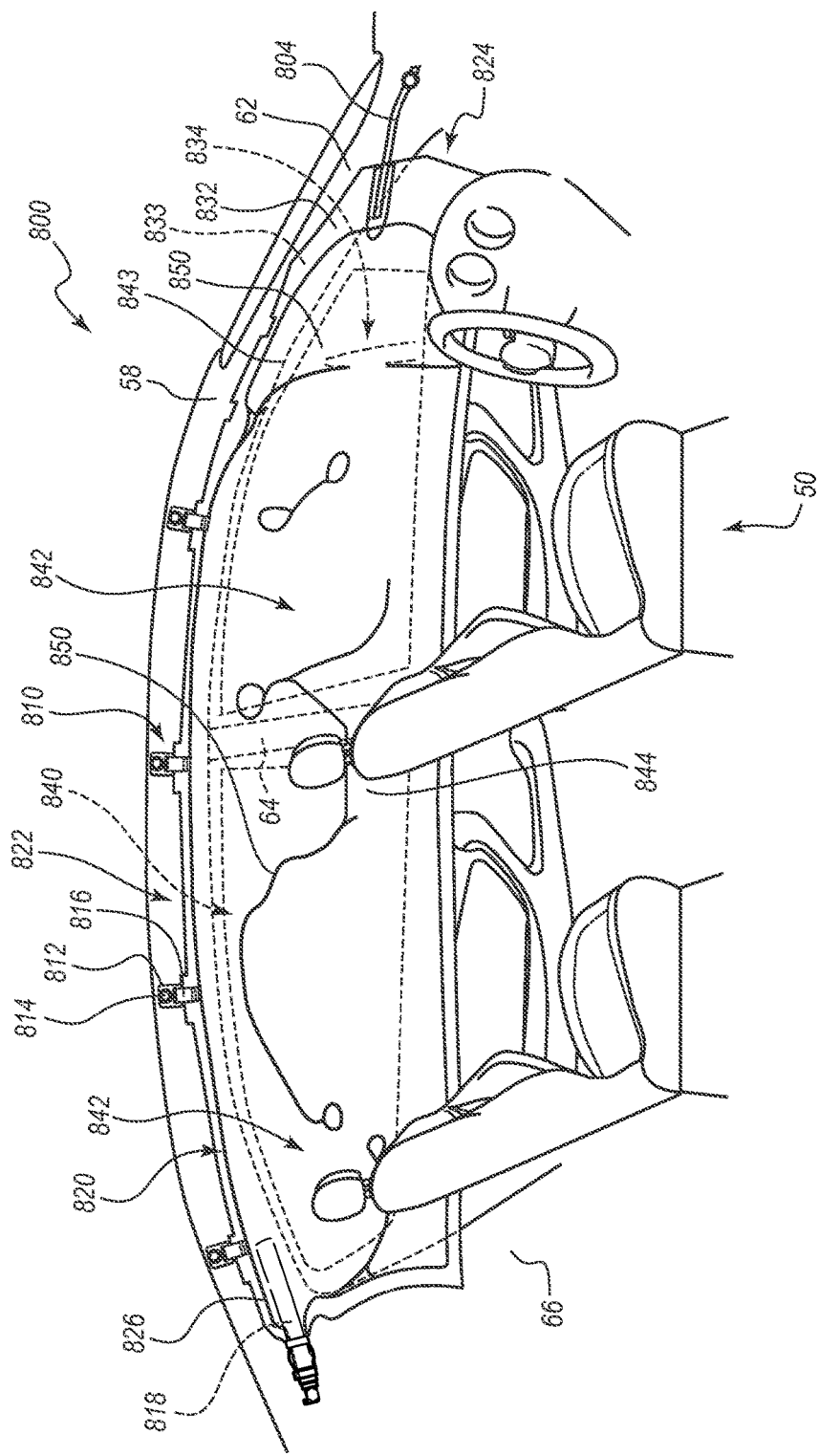
FIG. 9 is an embodiment of an inflatable curtain airbag assembly mounted within a vehicle, in a deployed configuration. The assembly includes a multi-chamber inflatable curtain airbag and a one-directional valve, according to one embodiment of the present disclosure, disposed in a receiving inflatable chamber to check gas flow in one direction from a first inflatable chamber to the receiving inflatable chamber.

FIG. 9 illustrates an embodiment of an inflatable curtain airbag assembly 800 mounted within a vehicle 50 and in a deployed configuration. The assembly 800 can include an inflatable curtain airbag 820, which can be secured to the vehicle 50 in any suitable manner. The inflatable curtain airbag 820 may also be referred to herein as a cushion or an airbag. The inflatable curtain airbag 820 includes multiple inflatable chambers 842, 843 and a one-directional valve 834, according to one embodiment of the present disclosure, disposed in a receiving inflatable chamber 843 to check gas flow in one direction from a first inflatable chamber 842 to the receiving inflatable chamber 843.

The assembly 800 can be attached to the vehicle 50 in any suitable manner. For example, in some embodiments, the assembly 800 includes one or more fastening assemblies 810 that are configured to secure one or more of the inflatable curtain airbags 820 to the vehicle 50. The assembly 800 can be mounted inside the vehicle 50 adjacent to a roof of the vehicle, such as to a roof rail 58. In the illustrated embodiment, each fastening assembly 810 includes a tether or strap 816 that is secured to mounting hardware, such as a tab 812 that is secured to the roof rail 58 via a fastener 814, such as a bolt. As can be appreciated, any other suitable fastening arrangement is contemplated.

A forward end of the assembly 800 can include a strap 804, which may be secured to the vehicle 50 in any suitable manner. For example, in the illustrated embodiment, the strap 804 is attached to a lower end of an A-pillar 62. As shown in FIG. 9, the strap 804 can be attached to a forward end 824 of the inflatable curtain airbag 820. An upper end 822 of the inflatable curtain airbag 820 can be attached to the straps 816. In some embodiments, the straps 816 are sewn to the inflatable curtain airbag 820. In other embodiments, the straps 816 may be integrally formed with the inflatable curtain airbag 820, and may extend from one or more panels of the inflatable curtain airbag 820.

With continued reference to FIG. 9, the assembly 800 can further include an inflator 818, which may be positioned within a throat 826 of the inflatable curtain airbag 820. The inflator 818 can be anchored to the roof rail 58, and may be of any suitable variety. In some embodiments, the inflator 818 comprises either a pyrotechnic device or a stored gas inflator. The inflator 818 can be in electronic communication with vehicle sensors which are configured to detect vehicle collisions and/or rollovers. Upon detection of predetermined conditions, the sensors can activate the inflator 818, and the inflatable curtain airbag 820 may be rapidly inflated.

The inflatable curtain airbag 820 can be configured to cover various structures of the vehicle 50 when deployed. For example, in some embodiments, at least a portion of the deployed inflatable curtain airbag 820 can cover one or more of the A-pillar 62, a B-pillar 64, and a C-pillar 66, and/or one or more side windows. The illustrated embodiment is configured to cover the B-pillar 64 and each of the front and rear side windows.

The inflatable curtain airbag 820 can define various portions that provide different amounts of cushioning relative to the vehicle structures. In particular, the inflatable curtain airbag 820 can include various inflatable chambers 842, 843 that are configured to be filled with inflation gases in order to cushion a vehicle occupant during a collision event. The inflatable curtain airbag 820 may further include segments configured to deploy at strategic areas at which a vehicle occupant may benefit most from cushioning. The illustrated embodiment includes a plurality of inflatable cushion segments that are in fluid communication with an inflation gas delivery channel 840.

In some embodiments, the inflatable curtain airbag 820 can include one or more non-inflatable regions 844, one or more of which may be positioned between adjacent inflatable cushion segments or at an interior of an inflatable chamber 842 (e.g., so as to be encompassed by an inflatable chamber 842).

In various embodiments, at least a portion of one or more of the inflatable chambers 842, 843, the cushion segments, and the non-inflatable regions 844 can be defined by one or more boundary seams 850. The one or more boundary seams 850 may be formed in any suitable manner. For example, in some embodiments, the one or more boundary seams 850 may comprise one or more of stitches, welds (e.g., radiofrequency welds), and/or adhesives. In other or further embodiments, the boundary seams 850 may be woven portions that are formed via one-piece weaving techniques. In some embodiments, the boundary seams 850 may join together two or more pieces of fabric, such as a front face 832 and a rear face 833. In some embodiments, the one or more boundary seams 850 are substantially airtight so as to be able to retain inflation gas within a given inflatable chamber 842.

The shapes of the inflatable curtain airbag 820 and its various components, such as the inflatable chambers 842, 843 that are depicted in FIG. 9, are not limiting, but rather representative of other types of multi-chamber airbags including a one-directional valve 834, according to the present disclosure. These shapes may be altered, so as to accommodate differently shaped vehicles.

Figure 10:
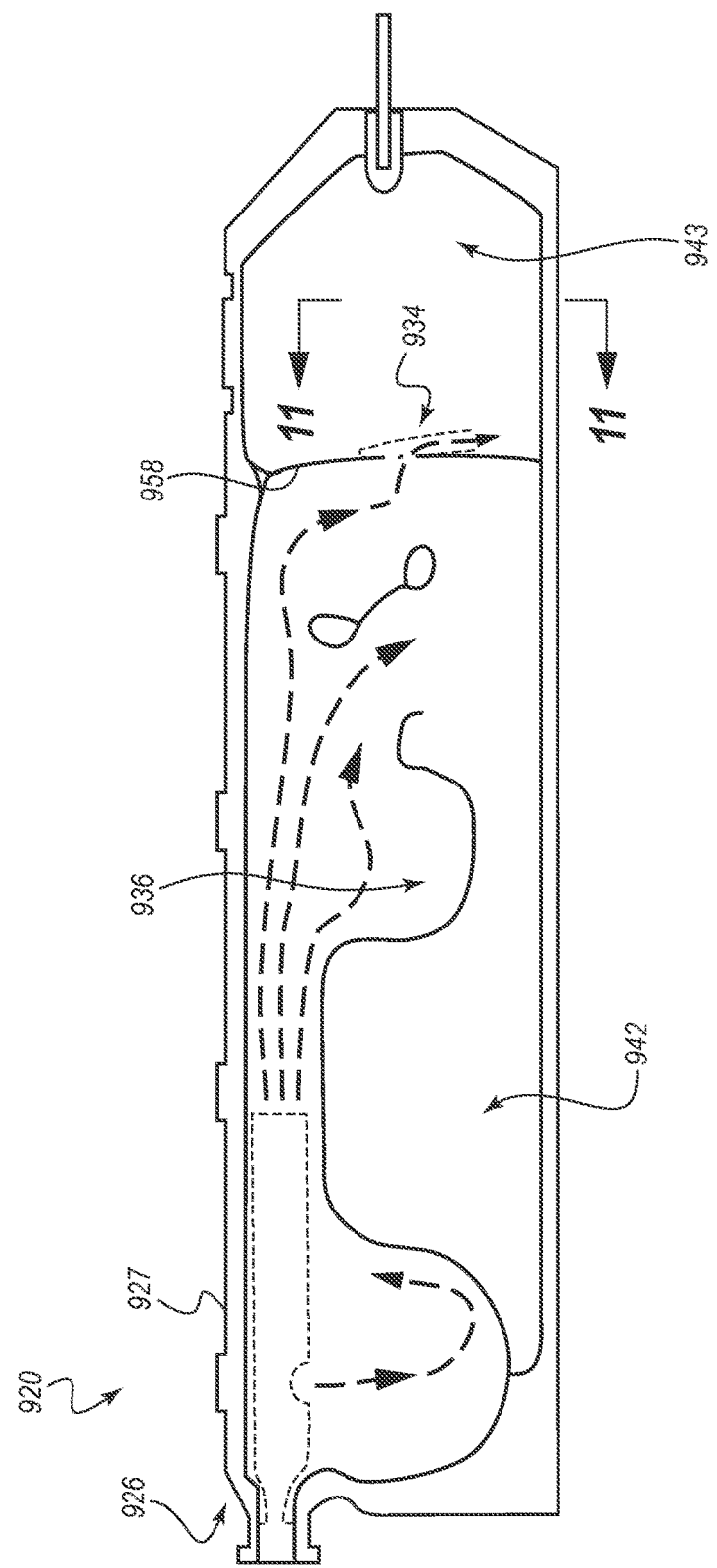
FIG. 10 is an inflatable curtain airbag including a first chamber, a second chamber, and a one-directional valve, according to one embodiment of the present disclosure.

FIG. 10 shows an inflatable curtain airbag 920 including a first chamber 942, a second chamber 943, and a one-directional valve 934, according to one embodiment of the present disclosure. In FIG. 10, a volume of the first chamber 942 is greater than a volume of the second chamber 943. As described above, other configurations of the first and second chambers 942, 943 are contemplated. The first chamber 942 can comprise a plurality of inflatable cushion segments 936 that are in fluid communication with the throat liner 927. The second chamber 943 can be configured to receive inflation gas from the first chamber 942. In some embodiments, the second chamber 943 can aid in controlling or maintaining an internal pressure of the inflatable curtain airbag 920. For example, one or more second chambers 943 may aid in maintaining the internal pressure below a predetermined value. In the illustrated embodiment, the second chamber 943 is isolated from each of the inflatable cushion segments 936, the throat liner 927, the throat portion 926, and the inflator 918 by a venting panel 958. Further, the inflatable curtain airbag 920 comprises one second chamber 943 distally disposed in the inflatable curtain airbag 920 relative to each of the venting panel 958, the first chamber 942, and the throat portion 926. The inflatable curtain airbag 920, as illustrated, comprises one venting panel 958 extending in a substantially transverse direction relative to the longitudinal orientation of the inflatable curtain airbag 920.

In other embodiments, there may be more than one second chamber 943 and/or more than one venting panel 958. In some embodiments, the one or more venting panels 958 may define a boundary of one or more of the inflatable cushion segments 936. The one or more second chambers 943 and/or venting panels 958 may also be disposed at any suitable position in the inflatable curtain airbag 920. In the illustrated embodiment, the venting panel 958 includes a one-directional valve 934, according to one embodiment of the present disclosure.

Figure 11:
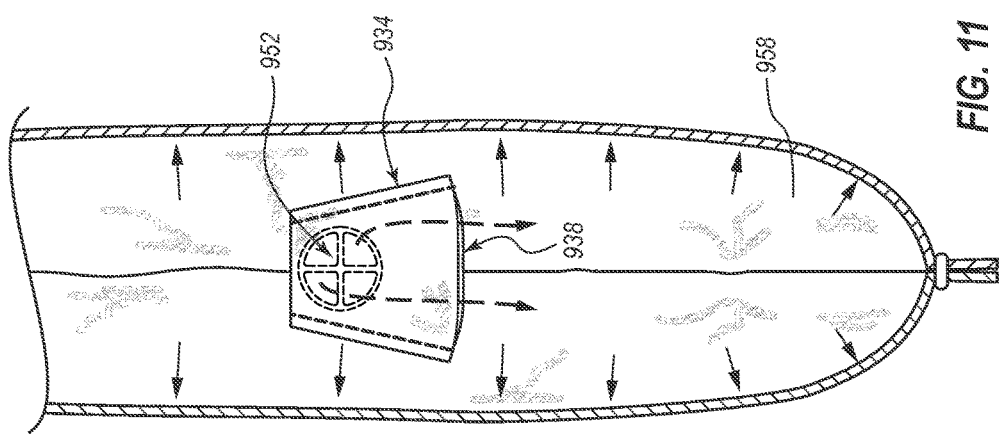
FIG. 11 is an enlarged cross-sectional view of the inflatable curtain airbag of FIG. 10.

FIG. 11 is an enlarged cross-sectional view of the inflatable curtain airbag 920 of FIG. 10, taken along line 11-11, depicting an embodiment of a venting panel 958 with a one-directional valve 934. Referring to FIGS. 10 and 11, generally and collectively, the venting panel 958 comprises a chamber sidewall of the first chamber 942 and the second chamber 943. A valve aperture 952 allows inflation gas to pass through from the first chamber 942 to the vent opening 938 and into the second chamber 943 while the pressure in the first chamber 942 remains higher than the pressure in the second chamber 943. The one-directional valve 934 is configured to transition from an open configuration to a closed configuration when a pressure of inflation gas in the second chamber 943 exceeds the pressure of the inflation gas in the first chamber 942.

The size and/or the shape of the one-directional valve 934 can be designed so the one-directional valve 934 may transition from an open configuration to a closed configuration at a predetermined rate for a particular volume of inflation gas present in the first chamber 942. For example, certain embodiments may include a one-directional valve with larger dimensions to allow inflation gas to transition from the first chamber into the second chamber at a greater flow rate than may be permitted by a one-directional valve with smaller dimensions. In another embodiment, the predetermined rate of inflation gas flow through the one-directional valve may remain unchanged when a vehicle occupant strikes a deployed inflatable curtain airbag during a collision event.

Figure 12:
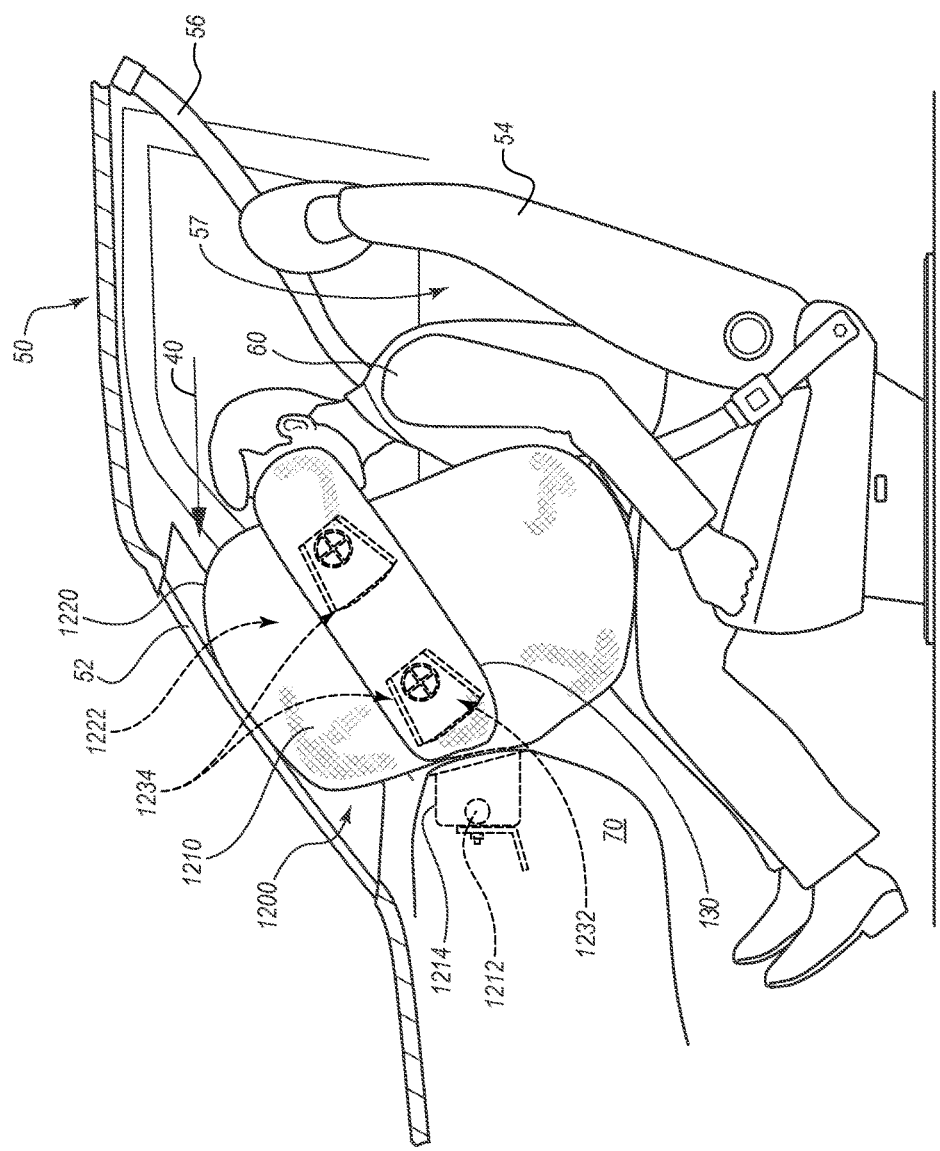
FIG. 12 is an airbag assembly, according to another embodiment of the present disclosure, in a deployed and inflated configuration to receive a vehicle occupant during a collision event.

FIG. 12 illustrates an airbag assembly 1200, according to another embodiment of the present disclosure, in a deployed and inflated configuration to receive the vehicle occupant 60 during a collision event. The occupant 60 is shown in a seat 54 configured to accommodate a single person as in FIG. 1B. The vehicle occupant 60 may occupy a vehicle occupant region 57 that is defined by the seat. In the event of a collision the vehicle occupant 60 may move in a forward direction 40 toward a primary cushion 1220 of the airbag assembly 1200.

The force present in a collision may, in other instances, cause the vehicle occupant 60 to move in a substantially different direction. For example the vehicle occupant 60 may move in a forward and inboard direction (e.g., an oblique direction). As described above with reference to FIG. 1B, in some instances the primary cushion 1220 may be sufficient to receive the vehicle occupant 60, but forces generated in the collision may cause the vehicle occupant 60 to roll off, glance, or even miss the primary cushion 1220.

The airbag assembly 1200 includes a secondary cushion 1230 that may be deployed with the primary cushion 1220. In the event that the vehicle occupant 60 does not engage the primary cushion 1220, the vehicle occupant 60 may be received by the secondary cushion 1230. In other embodiments the secondary cushion 1230 may be positioned to stabilize the primary cushion 1220 to make the primary cushion more resistant to rolling or otherwise missing the vehicle occupant 60.

In some embodiments, the size of the secondary cushion 1230 may be less than the size of the primary cushion 1220. In other embodiments the size of the secondary cushion 1230 may be equal to or greater than the primary cushion 1220. In the airbag assembly of FIG. 12, the secondary cushion 1230 extends rearward past the primary cushion 1220 to better receive the vehicle occupant 60 in the event of a collision. The secondary cushion 1230 extends past the primary cushion 1220 in a direction rearward with respect to the vehicle. Stated otherwise, the secondary cushion 1230 extends rearward in a direction toward a vehicle seat, beyond where the primary cushion 1220 extends.

The airbag assembly 1200 includes one or more one-directional valves 1234 to allow inflation gases to vent in one direction from the primary cushion 1220 to the secondary cushion. In some embodiments the secondary cushion 1230 may comprise a single one-directional valve 1234. In other embodiments the secondary cushion may comprise a plurality of one-directional valves 1234, as shown in FIG. 12.

It will be obvious to those having skill in the art that many changes may be made to the details of the above-described embodiments without departing from the underlying principles of the invention. The scope of the present invention should, therefore, be determined only by the following claims.

What is claimed is:

1. An airbag assembly comprising:
   a first cushion portion that defines a first inflatable chamber that is configured to receive inflation gas from an inflator to expand the first cushion portion from a compact state to a deployed state, the first cushion portion including a cushion side panel defining a cushion vent aperture to vent inflation gas;
   a second cushion portion coupled to the first cushion portion, wherein the second cushion portion defines a second inflatable chamber that is configured to receive inflation gas from the cushion vent aperture of the first inflatable chamber to expand the second cushion portion from a compact state to a deployed state; and
   a one-directional valve that permits flow of inflation gas through the cushion vent aperture from the first inflatable chamber to the second inflatable chamber and restricts flow of inflation gas from the second inflatable chamber to the first inflatable chamber, the one-directional valve comprising:
      a first valve layer including a valve aperture corresponding to the cushion vent aperture, wherein the first valve layer is disposed within the second inflatable chamber and secured to a cushion sidewall adjacent the cushion vent aperture, with the valve aperture and the cushion vent aperture aligned; and
      a second valve layer overlaying the first valve layer over the valve aperture, wherein the second valve layer is secured to the first valve layer along one or more edges of the second valve layer and unsecured to the first valve layer along at least one edge of the second valve layer to form a valve opening between the first valve layer and the second valve layer,
   wherein the first valve layer and the second valve layer part at the valve opening to allow inflation gas to flow from the valve aperture into the second inflatable chamber, and wherein the second valve layer collapses onto the first valve layer to close the valve opening when a pressure in the second inflatable chamber exceeds a pressure in the first inflatable chamber to restrict gas flow from the second cushion portion into the first cushion portion.

2. The airbag assembly of claim 1, wherein a first portion of the first valve layer is secured to the cushion sidewall adjacent the cushion vent aperture, with the valve aperture and the cushion vent aperture aligned, and wherein a second portion of the first valve layer is unsecured relative to the cushion sidewall.

3. The airbag assembly of claim 2, wherein the first portion of the first valve layer is secured to the cushion sidewall by stitching at a perimeter of the valve aperture and the cushion vent aperture.

4. The airbag assembly of claim 2, wherein the first portion of the first valve layer is secured to the cushion sidewall by an adhesive at a perimeter of the valve aperture and the cushion vent aperture.

5. The airbag assembly of claim 1, wherein the second valve layer is secured to the first valve layer by stitching along one or more edges of the second valve layer.

6. The airbag assembly of claim 1, wherein the second valve layer is secured to the first valve layer by an adhesive along one or more edges of the second valve layer.

7. The airbag assembly of claim 1, wherein the first valve layer is secured to an interior surface of a cushion sidewall of the second cushion portion.

8. The airbag assembly of claim 1, wherein the cushion sidewall is a sidewall of the first cushion portion that is shared by the second cushion portion, and wherein the first valve layer is secured to a surface of the cushion sidewall exterior to the first inflatable chamber and interior to the second inflatable chamber.

9. The airbag assembly of claim 1, wherein the valve aperture corresponds in size to the cushion vent aperture.

10. The airbag assembly of claim 1, wherein the valve aperture corresponds in shape to the cushion vent aperture.

11. The airbag assembly of claim 1, wherein the first valve layer is further secured to the cushion sidewall at a position a distance from the valve aperture to maintain the valve opening a distance from the valve aperture.

12. The airbag assembly of claim 1, wherein the second cushion portion extends rearward past the first cushion portion.

13. The airbag assembly of claim 1, wherein the only attachment between the one-directional valve and the cushion sidewall is achieved via securement of the first valve layer to the cushion sidewall, such that the second valve layer is coupled with the cushion sidewall only indirectly by virtue of being secured to the first valve layer.

14. The airbag assembly of claim 1, wherein the one or more edges along which the second valve layer is secured to the first valve layer are unattached to the cushion sidewall such that both the first valve layer and the second valve layer are free from the cushion sidewall along the one or more edges.

15. The airbag assembly of claim 1, wherein first valve layer is fixedly secured to the cushion sidewall only at said position adjacent the cushion vent aperture.

16. The airbag assembly of claim 1, wherein first valve layer is fixedly secured to the cushion sidewall only at said position adjacent the cushion vent aperture and at a position adjacent to the valve opening.

17. The airbag assembly of claim 1, wherein a portion of the first valve layer that forms the valve opening is secured to the second valve layer at opposite sides of the valve opening and is unsecured from the cushion sidewall at said opposite sides of the valve opening.

18. The airbag assembly of claim 1, wherein the second valve layer is unsecured from the cushion sidewall at and adjacent to the valve opening such that the one-directional valve opens and closes independently of the cushion sidewall.

19. The airbag assembly of claim 1, wherein both the first and second valve layers are unsecured from the cushion sidewall at and adjacent to the valve opening such that the one-directional valve opens and closes independently of the cushion sidewall.

20. The airbag assembly of claim 1, wherein the first valve layer is secured to the cushion sidewall around the valve aperture so as to surround the valve aperture.

21. The airbag assembly of claim 1, wherein the first valve layer and the second valve layer permit the one-directional valve to close independent of the cushion sidewall, wherein the one-directional valve is in an open state when the second valve layer extends a distance away from the first valve layer, and wherein the one-directional valve is in a closed state when the second valve layer is collapsed onto the first valve layer.

22. The airbag assembly of claim 1, wherein the valve opening operates independent of the cushion sidewall such that when a back pressure arises in the second inflatable chamber, the valve opening closes independent of one or more of an uneven shape of, a tension in, or a force on the cushion sidewall.

23. The airbag assembly of claim 1, wherein lateral edges of the first valve layer and the second valve layer are attached to each other but are not attached to the cushion sidewall.

24. The airbag assembly of claim 1, wherein the second valve layer is not stitched to the cushion sidewall.

25. The airbag assembly of claim 1, wherein each of the valve aperture and the cushion vent aperture comprises a web that prevents the second valve layer from pushing into the valve aperture and the cushion vent aperture during closure of the one-directional valve.

26. A one-directional valve that permits flow of air in a single direction from a first inflatable chamber to a second inflatable chamber of an airbag assembly, the one-directional valve comprising:
a first panel having defined therein a valve aperture corresponding to a cushion vent aperture in a chamber sidewall separating the first inflatable chamber from the second inflatable chamber, wherein the first panel is configured to be secured to the cushion sidewall adjacent the cushion vent aperture with the valve aperture and the cushion vent aperture aligned; and
a second panel overlaying the first panel over the valve aperture, wherein the second panel is secured to the first panel along one or more edges of the second panel and is unsecured to the first panel along at least one edge of the second panel to form a valve opening between the first panel and the second panel,
wherein the valve aperture is configured to receive air from the first inflatable chamber, wherein the first panel and the second panel part at the valve opening to allow inflation gas to flow from the valve aperture into the second inflatable chamber, and wherein the second valve layer collapses onto the first valve layer to close the valve opening when a pressure in the second inflatable chamber exceeds a pressure in the first inflatable chamber to restrict air flow from the second cushion portion into the first cushion portion.

27. The one-directional valve of claim 26, wherein a first portion of the first valve panel is configured to be secured to the chamber sidewall adjacent the cushion vent aperture with the valve aperture and the cushion vent aperture aligned, and wherein a second portion of the first valve layer is unsecured relative to the cushion sidewall.

28. The one-directional valve of claim 26, wherein the valve aperture corresponds in size to the cushion vent aperture.

29. The one-directional valve of claim 26, wherein the valve aperture corresponds in shape to the cushion vent aperture.

30. A method of forming a one-directional valve, comprising:
forming a valve aperture in a first valve panel, the valve aperture corresponding to a vent aperture in a first chamber through which the one-directional valve is to provide one-directional flow of air into a second chamber,
securing a second valve panel overlaying the first valve panel, including the valve aperture of the first valve panel, along one or more edges of the second valve panel, wherein the second valve panel remains unsecured to the first valve panel along at least one edge of the second valve panel to form a valve opening between the first valve panel and the second valve panel,
wherein the second valve panel is configured to part from the first valve panel at the valve opening to allow inflation gas to flow from the valve aperture through the valve opening, and
wherein the second valve panel is configured to collapse against the first valve panel to close the valve opening when a pressure in the second chamber exceeds a pressure in the first chamber to restrict air flow from the second chamber into the first chamber.

31. The method of claim 30, further comprising securing a first portion of the first valve layer to a chamber sidewall within the second chamber and adjacent the vent aperture, with the valve aperture and the cushion vent aperture aligned, wherein a second portion of the first valve layer is unsecured relative to the chamber sidewall.

32. The method of claim 31, further comprising securing a third portion of the first valve layer to the chamber sidewall at a position a distance from the valve aperture to maintain the valve opening a distance from the valve aperture.

33. The method of claim 31, wherein the first portion of the first valve layer is secured to the chamber sidewall by stitching at a perimeter of the valve aperture and the vent aperture.

* * * * *